(12) United States Patent
Rajan et al.

(10) Patent No.: US 9,524,502 B2
(45) Date of Patent: Dec. 20, 2016

(54) MANAGEMENT OF DYNAMIC ELECTRONIC COUPONS

(75) Inventors: Rajeev D. Rajan, San Diego, CA (US); Kamran Moallemi, Del Mar, CA (US); Michal James Koenig, Encinitas, CA (US); Oliver Michaelis, San Diego, CA (US); Paul E. Jacobs, La Jolla, CA (US); Jose Ricardo Dos Santos, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 580 days.

(21) Appl. No.: 12/142,597

(22) Filed: Jun. 19, 2008

(65) Prior Publication Data

US 2009/0076912 A1 Mar. 19, 2009

Related U.S. Application Data

(60) Provisional application No. 60/945,100, filed on Jun. 20, 2007.

(51) Int. Cl.
*G06Q 30/00* (2012.01)
*G06Q 30/02* (2012.01)

(52) U.S. Cl.
CPC .......... *G06Q 30/02* (2013.01); *G06Q 30/0267* (2013.01)

(58) Field of Classification Search
CPC combination set(s) only.
See application file for complete search history.

(56) References Cited

U.S. PATENT DOCUMENTS

| 4,006,477 A | 2/1977 | Yost, Jr. et al. |
| 5,382,957 A | 1/1995 | Blume |
| 5,687,169 A | 11/1997 | Fullerton |
| 5,764,696 A | 6/1998 | Barnes et al. |

(Continued)

FOREIGN PATENT DOCUMENTS

| CN | 1432949 A | 7/2003 |
| CN | 1633660 A | 6/2005 |

(Continued)

OTHER PUBLICATIONS

Blundo, C. et al.: "Secure E-Coupons," Electronic Commerce Research, vol. 5, No. 1, pp. 1179-139, Kluwer, Dordrecth, NL, (Jan. 1, 2005), XP002380651, ISSN: 1389-5753, Section 8.4.

(Continued)

*Primary Examiner* — Matthew T Sittner
(74) *Attorney, Agent, or Firm* — Shirin Tefagh

(57) ABSTRACT

Providing for management of a dynamic mobile coupon (DMC) at a mobile device is described herein. Particularly, dynamic characteristics associated with the DMC, such as a redeemable value, can be utilized to browse, sort, search, recall, or redeem the DMC utilizing a user interface of the mobile device. In other aspects, a DMC management application can interact with server components to backup and store DMC data, synchronize dynamic information (e.g., a dynamic redeemable value), access or manage a user profile, interface with other mobile devices to accomplish sharing, trading, exchanging, selling the DMC, and so on. Accordingly, provided is an efficient and personable way to manage mobile coupons in a mobile operating environment and provide increased value and utility for a user of such coupons.

41 Claims, 11 Drawing Sheets

(56) References Cited

U.S. PATENT DOCUMENTS

| | | |
|---|---|---|
| 5,812,081 A | 9/1998 | Fullerton |
| 5,832,035 A | 11/1998 | Fullerton |
| 5,907,427 A | 5/1999 | Scalora et al. |
| 5,952,956 A | 9/1999 | Fullerton |
| 5,960,031 A | 9/1999 | Fullerton et al. |
| 5,963,581 A | 10/1999 | Fullerton et al. |
| 5,969,663 A | 10/1999 | Fullerton et al. |
| 5,970,148 A | 10/1999 | Meier |
| 5,995,534 A | 11/1999 | Fullerton et al. |
| 6,025,795 A | 2/2000 | Hulderman et al. |
| 6,031,862 A | 2/2000 | Fullerton et al. |
| 6,091,374 A | 7/2000 | Barnes |
| 6,111,536 A | 8/2000 | Richards et al. |
| 6,133,876 A | 10/2000 | Fullerton et al. |
| 6,177,903 B1 | 1/2001 | Fullerton et al. |
| 6,218,979 B1 | 4/2001 | Barnes et al. |
| 6,295,019 B1 | 9/2001 | Richards et al. |
| 6,297,773 B1 | 10/2001 | Fullerton et al. |
| 6,300,903 B1 | 10/2001 | Richards et al. |
| 6,304,623 B1 | 10/2001 | Richards et al. |
| 6,332,193 B1 | 12/2001 | Glass et al. |
| 6,351,652 B1 | 2/2002 | Finn et al. |
| 6,354,946 B1 | 3/2002 | Finn |
| 6,400,307 B2 | 6/2002 | Fullerton et al. |
| 6,400,329 B1 | 6/2002 | Barnes |
| 6,421,389 B1 | 7/2002 | Jett et al. |
| 6,430,208 B1 | 8/2002 | Fullerton et al. |
| 6,437,756 B1 | 8/2002 | Schantz |
| 6,462,701 B1 | 10/2002 | Finn |
| 6,466,125 B1 | 10/2002 | Richards et al. |
| 6,469,628 B1 | 10/2002 | Richards et al. |
| 6,483,461 B1 | 11/2002 | Matheney et al. |
| 6,489,893 B1 | 12/2002 | Richards et al. |
| 6,492,904 B2 | 12/2002 | Richards |
| 6,492,906 B1 | 12/2002 | Richards et al. |
| 6,501,393 B1 | 12/2002 | Richards et al. |
| 6,504,483 B1 | 1/2003 | Richards et al. |
| 6,512,455 B2 | 1/2003 | Finn et al. |
| 6,512,488 B2 | 1/2003 | Schantz |
| 6,519,464 B1 | 2/2003 | Santhoff et al. |
| 6,529,568 B1 | 3/2003 | Richards et al. |
| 6,538,615 B1 | 3/2003 | Schantz |
| 6,539,213 B1 | 3/2003 | Richards et al. |
| 6,549,567 B1 | 4/2003 | Fullerton |
| 6,552,677 B2 | 4/2003 | Barnes et al. |
| 6,556,621 B1 | 4/2003 | Richards et al. |
| 6,560,463 B1 | 5/2003 | Santhoff |
| 6,571,089 B1 | 5/2003 | Richards et al. |
| 6,573,857 B2 | 6/2003 | Fullerton et al. |
| 6,577,691 B2 | 6/2003 | Richards et al. |
| 6,585,597 B2 | 7/2003 | Finn |
| 6,593,886 B2 | 7/2003 | Schantz |
| 6,606,051 B1 | 8/2003 | Fullerton et al. |
| 6,611,234 B2 | 8/2003 | Fullerton et al. |
| 6,611,811 B1 | 8/2003 | Deaton et al. |
| 6,614,384 B2 | 9/2003 | Hall et al. |
| 6,614,387 B1 | 9/2003 | Deadman |
| 6,621,462 B2 | 9/2003 | Barnes |
| 6,636,566 B1 | 10/2003 | Roberts et al. |
| 6,636,567 B1 | 10/2003 | Roberts et al. |
| 6,636,573 B2 | 10/2003 | Richards et al. |
| 6,642,903 B2 | 11/2003 | Schantz |
| 6,650,894 B1 | 11/2003 | Berstis et al. |
| 6,661,342 B2 | 12/2003 | Hall et al. |
| 6,667,724 B2 | 12/2003 | Barnes et al. |
| 6,670,909 B2 | 12/2003 | Kim |
| 6,671,310 B1 | 12/2003 | Richards et al. |
| 6,674,396 B2 | 1/2004 | Richards et al. |
| 6,677,796 B2 | 1/2004 | Brethour et al. |
| 6,700,538 B1 | 3/2004 | Richards |
| 6,710,736 B2 | 3/2004 | Fullerton et al. |
| 6,717,992 B2 | 4/2004 | Cowie et al. |
| 6,748,040 B1 | 6/2004 | Johnson et al. |
| 6,750,757 B1 | 6/2004 | Gabig, Jr. et al. |
| 6,759,948 B2 | 7/2004 | Grisham et al. |
| 6,760,387 B2 | 7/2004 | Langford et al. |
| 6,762,712 B2 | 7/2004 | Kim |
| 6,763,057 B1 | 7/2004 | Fullerton et al. |
| 6,763,282 B2 | 7/2004 | Glenn et al. |
| 6,774,764 B2 | 8/2004 | Ghosh et al. |
| 6,774,846 B2 | 8/2004 | Fullerton et al. |
| 6,774,859 B2 | 8/2004 | Schantz et al. |
| 6,778,603 B1 | 8/2004 | Fullerton et al. |
| 6,781,530 B2 | 8/2004 | Moore |
| 6,782,048 B2 | 8/2004 | Santhoff |
| 6,788,730 B1 | 9/2004 | Richards et al. |
| 6,822,604 B2 | 11/2004 | Hall et al. |
| 6,823,022 B1 | 11/2004 | Fullerton et al. |
| 6,836,223 B2 | 12/2004 | Moore |
| 6,836,226 B2 | 12/2004 | Moore |
| 6,844,816 B1 | 1/2005 | Melton et al. |
| 6,845,253 B1 | 1/2005 | Schantz |
| 6,847,675 B2 | 1/2005 | Fullerton et al. |
| 6,862,575 B1 * | 3/2005 | Anttila .................. G06Q 30/02 705/14.14 |
| 6,879,878 B2 | 4/2005 | Glenn et al. |
| 6,882,301 B2 | 4/2005 | Fullerton |
| 6,895,034 B2 | 5/2005 | Nunally et al. |
| 6,895,236 B2 | 5/2005 | Shuster |
| 6,898,434 B2 | 5/2005 | Pradhan et al. |
| 6,900,732 B2 | 5/2005 | Richards |
| 6,906,625 B1 | 6/2005 | Taylor et al. |
| 6,907,244 B2 | 6/2005 | Santhoff et al. |
| 6,907,270 B1 | 6/2005 | Blanz |
| 6,912,240 B2 | 6/2005 | Kumar et al. |
| 6,914,949 B2 | 7/2005 | Richards et al. |
| 6,917,284 B2 | 7/2005 | Grisham et al. |
| 6,919,838 B2 | 7/2005 | Santhoff |
| 6,922,166 B2 | 7/2005 | Richards et al. |
| 6,922,177 B2 | 7/2005 | Barnes et al. |
| 6,925,109 B2 | 8/2005 | Richards et al. |
| 6,933,882 B2 | 8/2005 | Fullerton |
| 6,937,639 B2 | 8/2005 | Pendergrass et al. |
| 6,937,663 B2 | 8/2005 | Jett et al. |
| 6,937,667 B1 | 8/2005 | Fullerton et al. |
| 6,937,674 B2 | 8/2005 | Santhoff et al. |
| 6,947,492 B2 | 9/2005 | Santhoff et al. |
| 6,950,485 B2 | 9/2005 | Richards et al. |
| 6,954,480 B2 | 10/2005 | Richards et al. |
| 6,959,031 B2 | 10/2005 | Haynes et al. |
| 6,959,032 B1 | 10/2005 | Richards et al. |
| 6,961,285 B2 | 11/2005 | Niemiec et al. |
| 6,961,541 B2 | 11/2005 | Overy et al. |
| 6,963,727 B2 | 11/2005 | Shreve |
| 6,980,613 B2 | 12/2005 | Krivokapic |
| 6,989,751 B2 | 1/2006 | Richards |
| 7,002,473 B2 | 2/2006 | Glick et al. |
| 7,003,289 B1 | 2/2006 | Kolls |
| 7,010,290 B2 | 3/2006 | Dent |
| 7,015,793 B2 | 3/2006 | Gabig, Jr. et al. |
| 7,020,224 B2 | 3/2006 | Krivokapic |
| 7,026,983 B2 | 4/2006 | Spratt |
| 7,027,425 B1 | 4/2006 | Fullerton et al. |
| 7,027,483 B2 | 4/2006 | Santhoff et al. |
| 7,027,493 B2 | 4/2006 | Richards |
| 7,030,806 B2 | 4/2006 | Fullerton |
| 7,039,392 B2 | 5/2006 | McCorkle et al. |
| 7,042,417 B2 | 5/2006 | Santhoff et al. |
| 7,046,187 B2 | 5/2006 | Fullerton et al. |
| 7,046,618 B2 | 5/2006 | Santhoff et al. |
| 7,058,414 B1 | 6/2006 | Rofheart et al. |
| 7,069,111 B2 | 6/2006 | Glenn et al. |
| 7,075,476 B2 | 7/2006 | Kim |
| 7,079,827 B2 | 7/2006 | Richards et al. |
| 7,098,769 B2 | 8/2006 | Ott |
| 7,099,367 B2 | 8/2006 | Richards et al. |
| 7,099,368 B2 | 8/2006 | Santhoff et al. |
| 7,116,266 B1 | 10/2006 | Vesel et al. |
| 7,119,659 B2 | 10/2006 | Bonalle et al. |
| 7,129,886 B2 | 10/2006 | Hall et al. |
| 7,132,975 B2 | 11/2006 | Fullerton et al. |
| 7,139,647 B2 | 11/2006 | Larsen |
| 7,145,954 B1 | 12/2006 | Pendergrass et al. |
| 7,148,791 B2 | 12/2006 | Grisham et al. |

(56) References Cited

U.S. PATENT DOCUMENTS

| | | |
|---|---|---|
| 7,149,533 B2 | 12/2006 | Laird et al. |
| 7,151,490 B2 | 12/2006 | Richards |
| 7,167,525 B2 | 1/2007 | Santhoff et al. |
| 7,170,408 B2 | 1/2007 | Taylor et al. |
| 7,178,719 B2 | 2/2007 | Silverbrook et al. |
| 7,181,192 B2 | 2/2007 | Panasik et al. |
| 7,184,938 B1 | 2/2007 | Lansford et al. |
| 7,188,244 B2 | 3/2007 | Matsuno |
| 7,190,722 B2 | 3/2007 | Lakkis et al. |
| 7,190,729 B2 | 3/2007 | Siwiak |
| 7,206,334 B2 | 4/2007 | Siwiak |
| 7,206,559 B2 | 4/2007 | Meade et al. |
| 7,209,724 B2 | 4/2007 | Richards et al. |
| 7,230,980 B2 | 6/2007 | Langford et al. |
| 7,239,277 B2 | 7/2007 | Fullerton et al. |
| 7,245,900 B1 | 7/2007 | Lamb et al. |
| RE39,759 E | 8/2007 | Fullerton |
| 7,256,727 B2 | 8/2007 | Fullerton et al. |
| 7,271,779 B2 | 9/2007 | Hertel |
| 7,277,715 B2 | 10/2007 | Starr et al. |
| 7,308,356 B2 | 12/2007 | Melaku et al. |
| 7,310,532 B2 | 12/2007 | Knauerhase et al. |
| 7,363,494 B2 | 4/2008 | Brainard et al. |
| 7,366,509 B2 | 4/2008 | Akgun et al. |
| 7,383,984 B2 | 6/2008 | Silverbrook et al. |
| 7,398,392 B2 | 7/2008 | Weber |
| 7,505,443 B2 | 3/2009 | McNew et al. |
| 7,554,979 B2 | 6/2009 | Ikeda |
| 7,581,113 B2 | 8/2009 | Smith et al. |
| 7,724,705 B2 | 5/2010 | Erola et al. |
| 7,739,157 B2 | 6/2010 | Bonner et al. |
| 7,783,532 B2* | 8/2010 | Hsu ............... G06Q 10/087 705/14.11 |
| 7,818,762 B2 | 10/2010 | Liu et al. |
| 7,870,021 B2 | 1/2011 | Mankoff |
| 7,870,229 B2 | 1/2011 | Spector |
| 7,933,895 B2* | 4/2011 | Amjadi ............ G06F 17/30864 705/14.1 |
| 8,332,270 B2 | 12/2012 | Sprigg et al. |
| 8,595,070 B1 | 11/2013 | Barnes et al. |
| 2001/0014870 A1* | 8/2001 | Saito ................ G06Q 20/204 705/14.26 |
| 2001/0042010 A1* | 11/2001 | Hassell ............. G06Q 30/02 705/14.13 |
| 2002/0002504 A1 | 1/2002 | Engel et al. |
| 2002/0004783 A1 | 1/2002 | Paltenghe et al. |
| 2002/0010627 A1 | 1/2002 | Lerat |
| 2002/0046084 A1 | 4/2002 | Steele et al. |
| 2002/0065713 A1* | 5/2002 | Awada ............. G06Q 30/02 705/14.39 |
| 2002/0091569 A1* | 7/2002 | Kitaura ............ G06Q 30/02 705/14.26 |
| 2002/0091571 A1* | 7/2002 | Thomas ........... G06Q 20/20 705/14.13 |
| 2002/0107738 A1 | 8/2002 | Beach et al. |
| 2002/0111140 A1 | 8/2002 | Kim |
| 2002/0111907 A1 | 8/2002 | Ling |
| 2002/0116271 A1* | 8/2002 | Mankoff ........... G06Q 20/20 705/14.25 |
| 2002/0117544 A1 | 8/2002 | Wolf et al. |
| 2002/0128903 A1* | 9/2002 | Kernahan ........ G06Q 30/02 705/14.22 |
| 2002/0138345 A1* | 9/2002 | Dickson .......... G06Q 30/02 705/14.36 |
| 2002/0138346 A1 | 9/2002 | Kodaka et al. |
| 2002/0161631 A1* | 10/2002 | Banerjee .......... G06Q 30/02 705/14.35 |
| 2002/0169665 A1 | 11/2002 | Hughes et al. |
| 2002/0169668 A1 | 11/2002 | Bank et al. |
| 2002/0169892 A1 | 11/2002 | Miyaoku et al. |
| 2002/0178060 A1* | 11/2002 | Sheehan ........... G06Q 30/02 705/14.25 |
| 2002/0194303 A1 | 12/2002 | Suila et al. |
| 2003/0004808 A1 | 1/2003 | Elhaoussine et al. |
| 2003/0004821 A1 | 1/2003 | Dutta et al. |
| 2003/0014306 A1* | 1/2003 | Marko ............. G06Q 20/387 705/14.13 |
| 2003/0055726 A1* | 3/2003 | Sohya ............. G06Q 10/02 705/14.22 |
| 2003/0074259 A1* | 4/2003 | Slyman, Jr. ...... G06Q 20/204 705/14.22 |
| 2003/0093283 A1* | 5/2003 | Morsa ............. G06Q 30/02 705/1.1 |
| 2003/0093314 A1 | 5/2003 | Leung et al. |
| 2003/0108009 A1 | 6/2003 | Petersen |
| 2003/0115152 A1 | 6/2003 | Flaherty |
| 2003/0117635 A1* | 6/2003 | Roberts ........... G06K 7/10851 358/1.2 |
| 2003/0158796 A1 | 8/2003 | Balent |
| 2003/0195806 A1 | 10/2003 | Willman et al. |
| 2003/0217153 A1 | 11/2003 | Rao et al. |
| 2003/0233190 A1* | 12/2003 | Jones .............. G08G 1/123 701/465 |
| 2004/0054575 A1* | 3/2004 | Marshall .......... G06Q 30/0236 705/14.36 |
| 2004/0054592 A1 | 3/2004 | Hernblad |
| 2004/0054732 A1 | 3/2004 | Carter et al. |
| 2004/0064351 A1 | 4/2004 | Mikurak |
| 2004/0117250 A1 | 6/2004 | Lubow et al. |
| 2004/0137886 A1* | 7/2004 | Ross ............... G06Q 30/02 455/414.1 |
| 2004/0143500 A1 | 7/2004 | Lopez et al. |
| 2004/0156326 A1 | 8/2004 | Chithambaram |
| 2004/0158490 A1 | 8/2004 | Sakamura et al. |
| 2004/0158492 A1 | 8/2004 | Lopez et al. |
| 2004/0177003 A1* | 9/2004 | Liao ............... G06Q 20/387 705/14.35 |
| 2004/0203963 A1* | 10/2004 | Shivaram ......... G06Q 30/0267 455/466 |
| 2004/0218574 A1 | 11/2004 | Sata et al. |
| 2004/0222302 A1 | 11/2004 | Matsumori |
| 2004/0233621 A1 | 11/2004 | Maeoka et al. |
| 2004/0240565 A1 | 12/2004 | Santhoff et al. |
| 2004/0243519 A1 | 12/2004 | Perttila |
| 2004/0254836 A1* | 12/2004 | Emoke Barabas .... G06Q 30/02 705/14.35 |
| 2005/0004840 A1 | 1/2005 | Wanninger |
| 2005/0027984 A1 | 2/2005 | Saito et al. |
| 2005/0038574 A1 | 2/2005 | Gila et al. |
| 2005/0040230 A1 | 2/2005 | Swartz et al. |
| 2005/0045718 A1* | 3/2005 | Bortolin ........... G06Q 20/346 235/383 |
| 2005/0114213 A1 | 5/2005 | Smith et al. |
| 2005/0131761 A1 | 6/2005 | Trika et al. |
| 2005/0132234 A1 | 6/2005 | Dawson |
| 2005/0135304 A1 | 6/2005 | Wentink et al. |
| 2005/0138576 A1 | 6/2005 | Baumert et al. |
| 2005/0184145 A1 | 8/2005 | Law et al. |
| 2005/0200671 A1 | 9/2005 | Mistry et al. |
| 2005/0204152 A1 | 9/2005 | Breitbach |
| 2005/0230473 A1 | 10/2005 | Fajkowski |
| 2005/0237270 A1 | 10/2005 | Adams et al. |
| 2006/0003776 A1 | 1/2006 | Natori et al. |
| 2006/0014532 A1 | 1/2006 | Seligmann et al. |
| 2006/0015404 A1* | 1/2006 | Tran ............... G06Q 30/0224 705/14.25 |
| 2006/0015405 A1* | 1/2006 | Bala ............... G06Q 30/02 705/14.66 |
| 2006/0026070 A1* | 2/2006 | Sun ................ G06Q 30/02 705/14.35 |
| 2006/0030341 A1 | 2/2006 | Pham |
| 2006/0068822 A1 | 3/2006 | Kalhan |
| 2006/0073851 A1 | 4/2006 | Colando et al. |
| 2006/0074784 A1 | 4/2006 | Brown |
| 2006/0111967 A1* | 5/2006 | Forbes ............ G06Q 30/02 705/14.26 |
| 2006/0130100 A1 | 6/2006 | Pentland |
| 2006/0143080 A1 | 6/2006 | Garg et al. |
| 2006/0177030 A1 | 8/2006 | Rajagopalan et al. |
| 2006/0178932 A1* | 8/2006 | Lang ............... G06Q 30/02 705/14.73 |
| 2006/0180664 A1 | 8/2006 | Barrett et al. |

(56) References Cited

U.S. PATENT DOCUMENTS

| | | | |
|---|---|---|---|
| 2006/0190331 A1* | 8/2006 | Tollinger | G06F 17/212 705/14.14 |
| 2006/0194569 A1 | 8/2006 | Hsueh | |
| 2006/0293968 A1 | 12/2006 | Brice et al. | |
| 2007/0017259 A1 | 1/2007 | Cho et al. | |
| 2007/0043626 A1 | 2/2007 | Duvall et al. | |
| 2007/0057051 A1 | 3/2007 | Bortolin et al. | |
| 2007/0061208 A1* | 3/2007 | Goldman | G06Q 30/02 705/14.25 |
| 2007/0061302 A1 | 3/2007 | Ramer et al. | |
| 2007/0087732 A1 | 4/2007 | Hsueh | |
| 2007/0112951 A1 | 5/2007 | Fung et al. | |
| 2007/0124209 A1 | 5/2007 | Walker et al. | |
| 2007/0131759 A1 | 6/2007 | Cox et al. | |
| 2007/0136657 A1* | 6/2007 | Blumenthal | G06F 17/241 715/201 |
| 2007/0136775 A1 | 6/2007 | MacKay et al. | |
| 2007/0138270 A1 | 6/2007 | Reblin | |
| 2007/0150339 A1* | 6/2007 | Retter | G06Q 30/02 705/14.26 |
| 2007/0156513 A1* | 7/2007 | Mastrianni | G06Q 30/02 705/14.11 |
| 2007/0173266 A1 | 7/2007 | Barnes, Jr. | |
| 2007/0174116 A1* | 7/2007 | Keith | G06Q 30/02 705/14.23 |
| 2007/0174259 A1* | 7/2007 | Amjadi | G06F 17/30864 |
| 2007/0182546 A1 | 8/2007 | Virk et al. | |
| 2007/0200671 A1 | 8/2007 | Kelley et al. | |
| 2007/0203792 A1 | 8/2007 | Rao | |
| 2007/0241189 A1 | 10/2007 | Slavin et al. | |
| 2007/0249288 A1 | 10/2007 | Moallemi et al. | |
| 2007/0259690 A1 | 11/2007 | Julian et al. | |
| 2007/0270129 A1 | 11/2007 | Luo | |
| 2007/0276537 A1 | 11/2007 | Walker et al. | |
| 2007/0285306 A1 | 12/2007 | Julian et al. | |
| 2007/0287386 A1 | 12/2007 | Agrawal et al. | |
| 2008/0040229 A1* | 2/2008 | Gholston | G06Q 30/0235 705/14.35 |
| 2008/0052169 A1* | 2/2008 | O'Shea | G06Q 20/10 705/14.17 |
| 2008/0065488 A1* | 3/2008 | Schwagmann | G06Q 30/02 705/14.36 |
| 2008/0072066 A1 | 3/2008 | Vogler et al. | |
| 2008/0074264 A1 | 3/2008 | Sharpe et al. | |
| 2008/0077484 A1 | 3/2008 | Main et al. | |
| 2008/0120186 A1 | 5/2008 | Jokinen et al. | |
| 2008/0133349 A1 | 6/2008 | Nazer et al. | |
| 2008/0133366 A1* | 6/2008 | Evans | G06Q 30/02 705/14.26 |
| 2008/0154714 A1 | 6/2008 | Liu et al. | |
| 2008/0154827 A1 | 6/2008 | Connors | |
| 2008/0167991 A1* | 7/2008 | Carlson | G06Q 30/0215 705/50 |
| 2008/0189170 A1 | 8/2008 | Ramachandra | |
| 2008/0207327 A1* | 8/2008 | Van Luchene | A63F 13/12 463/42 |
| 2008/0208688 A1* | 8/2008 | Byerley | G06Q 30/02 705/14.39 |
| 2008/0215430 A1* | 9/2008 | Ellis | G06Q 30/0212 705/14.14 |
| 2008/0221984 A1* | 9/2008 | Abhyanker | G06Q 30/02 705/14.35 |
| 2008/0238615 A1 | 10/2008 | Carpenter | |
| 2008/0240440 A1 | 10/2008 | Rose et al. | |
| 2008/0262928 A1* | 10/2008 | Michaelis | 705/14 |
| 2008/0270231 A1* | 10/2008 | Li | G06Q 30/0211 705/14.13 |
| 2008/0300970 A1 | 12/2008 | Scheibe | |
| 2008/0300984 A1 | 12/2008 | Li | |
| 2009/0030779 A1* | 1/2009 | Tollinger | G06Q 30/02 705/14.1 |
| 2009/0061884 A1 | 3/2009 | Rajan et al. | |
| 2009/0076911 A1 | 3/2009 | Vo et al. | |
| 2009/0088182 A1 | 4/2009 | Piersol et al. | |
| 2009/0098903 A1 | 4/2009 | Donaldson et al. | |
| 2009/0108064 A1 | 4/2009 | Fernandes et al. | |
| 2009/0164309 A1 | 6/2009 | Mgrdechian et al. | |
| 2009/0178144 A1 | 7/2009 | Redlich et al. | |
| 2009/0233575 A1 | 9/2009 | Morrison | |
| 2010/0066498 A1 | 3/2010 | Fenton | |
| 2010/0138303 A1* | 6/2010 | Preston | G06F 17/212 705/14.64 |
| 2010/0153205 A1* | 6/2010 | Retter | G06Q 30/02 705/14.26 |
| 2010/0174615 A1 | 7/2010 | Weaver | |
| 2010/0185504 A1 | 7/2010 | Rajan et al. | |
| 2010/0205043 A1 | 8/2010 | Edwards | |
| 2010/0241574 A1 | 9/2010 | Salazar | |
| 2010/0257020 A1 | 10/2010 | Bryant et al. | |
| 2010/0280960 A1 | 11/2010 | Ziotopoulos et al. | |
| 2010/0289640 A1 | 11/2010 | Annamalai | |
| 2010/0299224 A1 | 11/2010 | Borom et al. | |
| 2011/0028160 A1 | 2/2011 | Roeding et al. | |
| 2011/0119132 A1 | 5/2011 | Morton et al. | |
| 2011/0215138 A1 | 9/2011 | Crum | |
| 2011/0250901 A1 | 10/2011 | Grainger et al. | |
| 2011/0276385 A1 | 11/2011 | Keller | |
| 2013/0006773 A1 | 1/2013 | Lutnick et al. | |
| 2013/0085827 A1 | 4/2013 | Jenkins | |
| 2013/0144703 A1 | 6/2013 | Vannoller et al. | |
| 2015/0017951 A1 | 1/2015 | Agrawal et al. | |
| 2015/0024689 A1 | 1/2015 | Agrawal | |
| 2016/0012489 A1 | 1/2016 | Rajan et al. | |

FOREIGN PATENT DOCUMENTS

| | | |
|---|---|---|
| CN | 1672382 | 9/2005 |
| CN | 1694122 A | 11/2005 |
| CN | 1716223 A | 1/2006 |
| CN | 1799061 A | 7/2006 |
| CN | 1879121 A | 12/2006 |
| CN | 1968167 A | 5/2007 |
| CN | 101384031 A | 3/2009 |
| CN | 101731017 A | 6/2010 |
| EP | 1758308 A1 | 2/2007 |
| EP | 1926335 A1 | 5/2008 |
| EP | 2184927 A1 | 5/2010 |
| JP | 11353555 A | 12/1999 |
| JP | 2000275328 A | 10/2000 |
| JP | 2001034658 A | 2/2001 |
| JP | 2001145785 A | 5/2001 |
| JP | 2001216449 A | 8/2001 |
| JP | 2001223712 A | 8/2001 |
| JP | 2001325507 A | 11/2001 |
| JP | 2002073666 A | 3/2002 |
| JP | 2002074131 A | 3/2002 |
| JP | 2002109237 A | 4/2002 |
| JP | 2002132886 A | 5/2002 |
| JP | 2002149945 A | 5/2002 |
| JP | 2002150102 A | 5/2002 |
| JP | 2002525641 A | 8/2002 |
| JP | 2002251555 A | 9/2002 |
| JP | 2002279274 A | 9/2002 |
| JP | 2002291047 | 10/2002 |
| JP | 2002374261 A | 12/2002 |
| JP | 2003006543 A | 1/2003 |
| JP | 2003023367 A | 1/2003 |
| JP | 2003051771 | 2/2003 |
| JP | 2003067606 A | 3/2003 |
| JP | 2003115001 A | 4/2003 |
| JP | 2003187140 A | 7/2003 |
| JP | 2003208381 A | 7/2003 |
| JP | 2003256705 A | 9/2003 |
| JP | 2003263582 A | 9/2003 |
| JP | 2004094543 A | 3/2004 |
| JP | 2004516989 A | 6/2004 |
| JP | 2004220522 A | 8/2004 |
| JP | 2004236166 A | 8/2004 |
| JP | 2004248215 A | 9/2004 |
| JP | 2004272463 A | 9/2004 |
| JP | 2004326303 A | 11/2004 |
| JP | 2004328542 A | 11/2004 |

(56) References Cited

FOREIGN PATENT DOCUMENTS

| | | |
|---|---|---|
| JP | 2004334885 A | 11/2004 |
| JP | 2004362470 A | 12/2004 |
| JP | 2005011318 A | 1/2005 |
| JP | 2005020350 A | 1/2005 |
| JP | 2005045756 A | 2/2005 |
| JP | 2005078173 A | 3/2005 |
| JP | 2005128903 A | 5/2005 |
| JP | 2005128965 A | 5/2005 |
| JP | 2005141686 A | 6/2005 |
| JP | 2005209114 A | 8/2005 |
| JP | 2005528016 A | 9/2005 |
| JP | 2005533316 A | 11/2005 |
| JP | 2005534260 A | 11/2005 |
| JP | 2006011806 A | 1/2006 |
| JP | 2006018511 A | 1/2006 |
| JP | 2006018824 A | 1/2006 |
| JP | 2006020004 A | 1/2006 |
| JP | 2006059219 A | 3/2006 |
| JP | 2006091355 A | 4/2006 |
| JP | 2006129000 A | 5/2006 |
| JP | 2006139431 A | 6/2006 |
| JP | 2006197458 | 7/2006 |
| JP | 2006227901 A | 8/2006 |
| JP | 2006246433 A | 9/2006 |
| JP | 2006295249 A | 10/2006 |
| JP | 2006318125 A | 11/2006 |
| JP | 2007025854 A | 2/2007 |
| JP | 2007502087 A | 2/2007 |
| JP | 2007072906 A | 3/2007 |
| JP | 2007133461 A | 5/2007 |
| JP | 2007201851 A | 8/2007 |
| JP | 2007213276 A | 8/2007 |
| JP | 2008225540 A | 9/2008 |
| JP | 2008293123 A | 12/2008 |
| JP | 2009104350 A | 5/2009 |
| JP | 2009188922 | 8/2009 |
| JP | 2010515168 A | 5/2010 |
| JP | 2010531028 A | 9/2010 |
| JP | 2013500538 A | 1/2013 |
| KR | 1020020068945 | 8/2002 |
| KR | 20020096946 A | 12/2002 |
| KR | 20030011744 A | 2/2003 |
| KR | 20030018741 A | 3/2003 |
| KR | 20040020309 A | 3/2004 |
| KR | 20040069122 A | 8/2004 |
| KR | 100512362 B1 | 9/2005 |
| KR | 20060014942 A | 2/2006 |
| KR | 20060018235 A | 2/2006 |
| KR | 20060064222 A | 6/2006 |
| KR | 20060124430 A | 12/2006 |
| KR | 20070016301 | 2/2007 |
| RU | 2150790 C1 | 6/2000 |
| RU | 2267156 C2 | 12/2005 |
| RU | 20050100782 | 2/2006 |
| RU | 2301450 C2 | 6/2007 |
| TW | I228364 | 2/2005 |
| TW | I228364 | 2/2005 |
| TW | I252324 | 4/2006 |
| TW | I252628 | 4/2006 |
| TW | I252639 | 4/2006 |
| TW | I252671 | 4/2006 |
| TW | I252324 | 4/2006 |
| TW | I252628 | 4/2006 |
| TW | I252639 | 4/2006 |
| TW | I252671 | 4/2006 |
| WO | WO9613920 A1 | 5/1996 |
| WO | 0175710 A1 | 10/2001 |
| WO | 0178423 A1 | 10/2001 |
| WO | 0221478 | 3/2002 |
| WO | WO0225823 | 3/2002 |
| WO | 0250732 A1 | 6/2002 |
| WO | WO02054353 A1 | 7/2002 |
| WO | WO03107289 | 12/2003 |
| WO | 2004008276 A2 | 1/2004 |
| WO | 2004014037 A1 | 2/2004 |
| WO | 2004027662 A1 | 4/2004 |
| WO | WO-2004107230 A1 | 12/2004 |
| WO | WO-2005045455 A2 | 5/2005 |
| WO | 2005064515 A1 | 7/2005 |
| WO | WO-2005110208 A1 | 11/2005 |
| WO | 2005122483 A1 | 12/2005 |
| WO | WO2006030341 | 3/2006 |
| WO | WO2006092772 A1 | 9/2006 |
| WO | 2007026745 A1 | 3/2007 |
| WO | WO2008027965 | 3/2008 |
| WO | 2008146576 A1 | 12/2008 |
| WO | WO2008157806 | 12/2008 |
| WO | 2009140438 A1 | 11/2009 |
| WO | 2010096617 A2 | 8/2010 |
| WO | 2011014292 A1 | 2/2011 |

OTHER PUBLICATIONS

International Search Report and Written Opinion—PCT/US08/067770, International Searching Authority, US, Alexandria, VA Dec. 31, 2008.

International Search Report and Written Opinion—PCT/US2010/043776—ISA/EPO—Apr. 20, 2011.

Translation of Office Action in Singapore application 200907742-1 corresponding to U.S. Appl. No. 12/142,159, citing US20060194569, US20040143500, US20020111907 and KR20020068945 dated Feb. 10, 2011.

"Examples of Judging whether Business-Related Inventions are Patentable" http://www.jpo.go.jp/tetuzuki/t_tokkyo/bijinesu/biz_pat_case.htm.

Bardia Alavi, et al., "Indoor Geolocat ion Distance Error Modeling using UWB Channel Measurements" ,2005 IEEE 16th International Symposium on Personal, Indoor and Mobile Radio Communications, Sep. 11-14, 2005.

Co-pending U.S Appl. No. 13/048,060, filed Mar. 15, 2011.

Supplementary European Search Report—EP08771661—Search Authority—Munich—May 3, 2011.

Lester, J et al., ""Are You With Me ?"—Using Accelerometers to Determine if Two Devices are Carried by the Same Person", LNCS, Pervasive Computing, Apr. 2004,vol. 3001, pp. 33-50.

"Digital Watermarking Alliance", Oct. 19, 2006, 8 pages, Retrieved from the Internet: URL: http://www.digitalwatermarkingalliance.org/faqs.asp [retrieved on Jul. 21, 2014].

Itao T., "Relationship Mechanism for Dynamic and User Preference-Aware Service Creation", Journal of the Information Processing Society of Japan, Japan, IPSJ, Mar. 15, 2003, vol. 44, No. 3, pp. 812-825.

Kirovski D., et al., "Spread Spectrum Watermarking of Audio Signals", IEEE Transactions on Signal Processing, vol. 51, No. 4, pp. 1020-33, Apr. 2003.

Roumeliotis, T., "Five geofencing ideas for mobile marketing from brands and retailers," Mobile Commerce Daily, Jul. 16, 2010, 2 pages, Retrieved from http://www.mobilecommercedaily.com/five-geofencing-ideas-for-mobile-marketing-from-brands-and-retailers.

Bardia Alavi, et al., "Indoor Geolocat ion Distance Error Modeling using UWB Channel Measurements",2005 IEEE 16th International Symposium on Personal, Indoor and Mobile Radio Communications, Sep. 11-14, 2005.

Okazaki, "Eight Methods for Capitalizing on Access Log Analysis, which are Essential to SEO, Marketing and Redesign", Web Creators, NdN Corporation, Japan, Mar. 1, 2005, vol. 39, pp. 148-155.

Co-pending U.S. Appl. No. 13/363,580, filed Feb. 1, 2012.

Co-pending U.S. Appl. No. 13/048,060, filed Mar. 15, 2011.

"Case Studies judgment on business related inventions" http://www.jpo.go.jp/tetuzuki/t_tokkyo/bijinesu/biz_pat_case.htm, Apr. 2003.

* cited by examiner

MANAGEMENT OF DYNAMIC ELECTRONIC COUPONS

CLAIM OF PRIORITY UNDER 35 U.S.C. §119

The present application for patent claims priority to Provisional Application No. 60/945,100 entitled COUPON WALLET SYSTEM filed Jun. 20, 2007, and assigned to the assignee hereof and hereby expressly incorporated by reference herein.

REFERENCE TO CO-PENDING APPLICATIONS FOR PATENT

The present application for patent is related to the co-pending U.S. patent application Ser. No. 12/124,834, entitled MOBILE COUPONS UTILIZING PEER TO PEER RANGING, filed May 21, 2008, assigned to the assignee hereof and expressly incorporated by reference herein, which in turn claimed priority to Provisional Application No. 60/945,120 entitled "METHOD AND APPARATUS FOR DELIVERING COUPONS BASED ON RANGING" filed Jun. 20, 2007; and U.S. patent application Ser. No. 12/142,159, entitled DYNAMIC ELECTRONIC COUPON FOR A MOBILE ENVIRONMENT, filed concurrently herewith, assigned to the assignee hereof and expressly incorporated by reference herein, which in turn claimed priority to Provisional Application No. 60/945,098 entitled "DYNAMIC COUPON SYSTEM" filed Jun. 20, 2007.

BACKGROUND

The following relates generally to a mobile operating environment, and more particularly to providing management of dynamic mobile coupons at a mobile device.

In recent years, a variety of advancements has occurred in cellular communication technology and cellular communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities, and so forth, to already popular communication devices (e.g., cellular telephones). As a result, such devices have become more popular in a consumer marketplace, motivating larger numbers of consumers to purchase such devices, or to upgrade to devices that include new applications and technologies.

As larger numbers of consumers own and utilize mobile devices, business mechanisms traditionally limited to personal, radio, television or landline telephone contact are expanding into the mobile environment. For instance, as the Internet becomes increasingly accessible via mobile communication devices, e-mail and web browsing applications are utilized with mobile devices. Further, electronic commerce is conducted by way of such devices as well. For instance, secure web applications can provide an interface for conducting online commercial transactions with a web browsing device. Credit card, debit card, bank transfer and like payments can be facilitated utilizing secure web applications by way of such device.

In addition to the foregoing, other commercial mechanisms have also been incorporated into mobile devices and mobile communication environments. For instance, mobile coupons stored on and configured for mobile devices (mobile coupons) can be utilized to replace paper coupons. A commercial entity can generate coupons and distribute them to mobile devices, which can in turn facilitate redemption of mobile coupons in conjunction with commercial transactions. As electronic files, such coupons have more flexibility than traditional paper coupons. For instance, a paper coupon is more readily misplaced as compared with a mobile coupon stored on a mobile device. Further, a mobile coupon can incorporate various security measures to mitigate duplication and other unauthorized uses. Accordingly, many benefits accrue upon introduction of mobile coupons in a mobile operating environment.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

The subject disclosure provides for management of an electronic coupon configured for a mobile device, also referred to as a mobile coupon. Such electronic coupons or mobile coupons can include dynamic characteristics, such as a redeemable value, and consequently can be termed dynamic electronic coupons (DEC) or dynamic mobile coupons (DMC), respectively. In some aspects, characteristics of a DMC are extracted from a DMC application and utilized to browse, sort, search, recall, or redeem the DMC at a user interface of the mobile device, or any suitable combination thereof. In other aspects, a DMC management application can interact with server components to backup and store DMC data, synchronize dynamic information (e.g., a dynamic redeemable value), access or manage a user profile, and so on. In addition, distribution of the DMC can be based at least in part on the user profile, a vendor profile, or determinable characteristics associated with the mobile device, such as location, proximity to a retail entity, or the like. Accordingly, provided is an efficient and personable way to manage mobile coupons for a mobile operating environment.

In some aspects, provided is a method of managing mobile coupons at a mobile device. The method can comprise obtaining a mobile coupon application from a remote device (e.g., via wired and/or wireless data exchange), wherein a mobile coupon integrated with the application comprises at least one variable characteristic. Further, the method can comprise facilitating browsing the mobile coupon at a user interface of a mobile device as a function of at least the variable characteristic and presenting an audio or video indication of the mobile coupon by playing the mobile coupon application at the user interface of the mobile device.

In one or more other aspects, provided is an apparatus that manages mobile coupons for a mobile device. The apparatus can comprise a transceiver configured for wireless data exchange that obtains a mobile coupon application, wherein a mobile coupon integrated with the mobile coupon application comprises at least one variable characteristic. Further, the apparatus can comprise a coupon management module configured to facilitate browsing the mobile coupon at a user interface of the apparatus as a function of at least the variable characteristic and an output module configured to present an audio or video indication of the mobile coupon by playing the mobile coupon application at the user interface of the apparatus. In addition to the foregoing, the apparatus can comprise memory configured to store data pertinent to receiving, browsing or presenting the mobile coupon application at the apparatus and a processor configured to implement the receiving, browsing or presenting the mobile coupon.

According to one or more additional aspects, disclosed is at least one processor configured to manage a mobile coupon for a mobile device. The processor(s) can comprise a first module configured to obtain a mobile coupon application from a remote device (e.g., via wired and/or wireless data exchange), wherein a mobile coupon integrated with the application comprises at least one variable characteristic. Moreover, the processor(s) can comprise a second module configured to facilitate browsing the mobile coupon at a user interface of a mobile device as a function of at least the variable characteristic. Additionally, the processor(s) can comprise a third module configured to present an audio or video indication of the mobile coupon by playing the mobile coupon application at the user interface of the mobile device.

In some aspects disclosed is an apparatus configured to manage a mobile coupon for a mobile device. The apparatus can comprise means for obtaining a mobile coupon application from a remote device, wherein a mobile coupon integrated with the mobile coupon application comprises at least one variable characteristic. In addition, the apparatus can comprise means for browsing the mobile coupon at a user interface of the apparatus as a function of at least the variable characteristic and means for presenting an audio or video indication of the mobile coupon by playing the mobile coupon application at the user interface of the mobile device.

According to still other aspects, disclosed is a computer program product comprising a computer-readable medium containing instructions configured to manage a mobile coupon for a mobile device. The instructions can include at least one instruction executable to cause a computer to obtain a mobile coupon application from a remote device, wherein a mobile coupon integrated with the mobile coupon application includes at least one variable characteristic. Further, the instructions can include at least one instruction executable to cause a computer to facilitate browsing the mobile coupon at a user interface of a mobile device as a function of at least the variable characteristic. In addition to the foregoing, the instructions can include at least one instruction executable to cause a computer to present an audio or video indication of the mobile coupon by playing the mobile coupon application at the user interface of the mobile device.

In accordance with an additional aspect, provided is a method of facilitating management of a mobile coupon at a mobile device. The method can comprise obtaining a rule for generation or distribution of a dynamic mobile coupon (DMC). The method can further comprise associating the DMC with the mobile device based on the rule and facilitating transmission of the DMC or an ID of the DMC to a coupon management application at the mobile device that categorizes and provides browsing of the DMC based on at least one characteristic of the DMC.

According to a further aspect, provided is an apparatus that facilitates management of a mobile coupon at a mobile device. The apparatus can comprise a vendor interface configured to receive a DMC or obtain a rule for generation or distribution of the DMC. Additionally, the apparatus can comprise a transceiver configured to transmit the DMC or an ID of the DMC to a coupon management application at the mobile device that categorizes and provides browsing of the DMC based on at least one characteristic of the DMC. In addition to the foregoing, the apparatus can comprise a mediation server configured to generate the DMC for the mobile device based on the rule.

In accordance with one or more additional aspects, disclosed is at least one processor configured to facilitate management of a DMC for a mobile device. The processor(s) can comprise a first module configured to obtain a rule for generation or distribution of a DMC and a second module configured to identify a mobile device as a target device based in part on a predetermined characteristic obtained at least in part via wireless data exchange with the mobile device. The processor(s) can also comprise a third module configured to facilitate transmission of the DMC or an ID of the DMC to a coupon management application at the mobile device that categorizes and provides browsing of the DMC based on at least one characteristic of the DMC.

According to one or more other aspects, disclosed is an apparatus configured to facilitate management of a DMC for a mobile device. The apparatus can comprise means for obtaining a rule for generation or distribution of a DMC and means for identifying a mobile device as a target device based in part on a predetermined characteristic obtained at least in par via wireless data exchange with the mobile device. The apparatus can further comprise means for facilitating transmission of the DMC or an ID of the DMC to a coupon management application at the mobile device that categorizes and provides browsing of the DMC based on at least one characteristic of the DMC.

In accordance with further aspects, disclosed is a computer program product comprising a computer-readable medium containing instructions configured to manage a mobile coupon for a mobile device. The instructions can include at least one instruction executable to cause a computer to obtain a rule for generation or distribution of a DMC and at least one instruction configured to cause a computer to identify a mobile device as a target device based in part on a predetermined characteristic obtained at least in part via wireless data exchange with the mobile device. Moreover, the instructions can include at least one instruction configured to cause a computer to facilitate transmission of the DMC or an ID of the DMC to a coupon management application at the mobile device that categorizes and provides browsing of the DMC based on at least one characteristic of the DMC.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
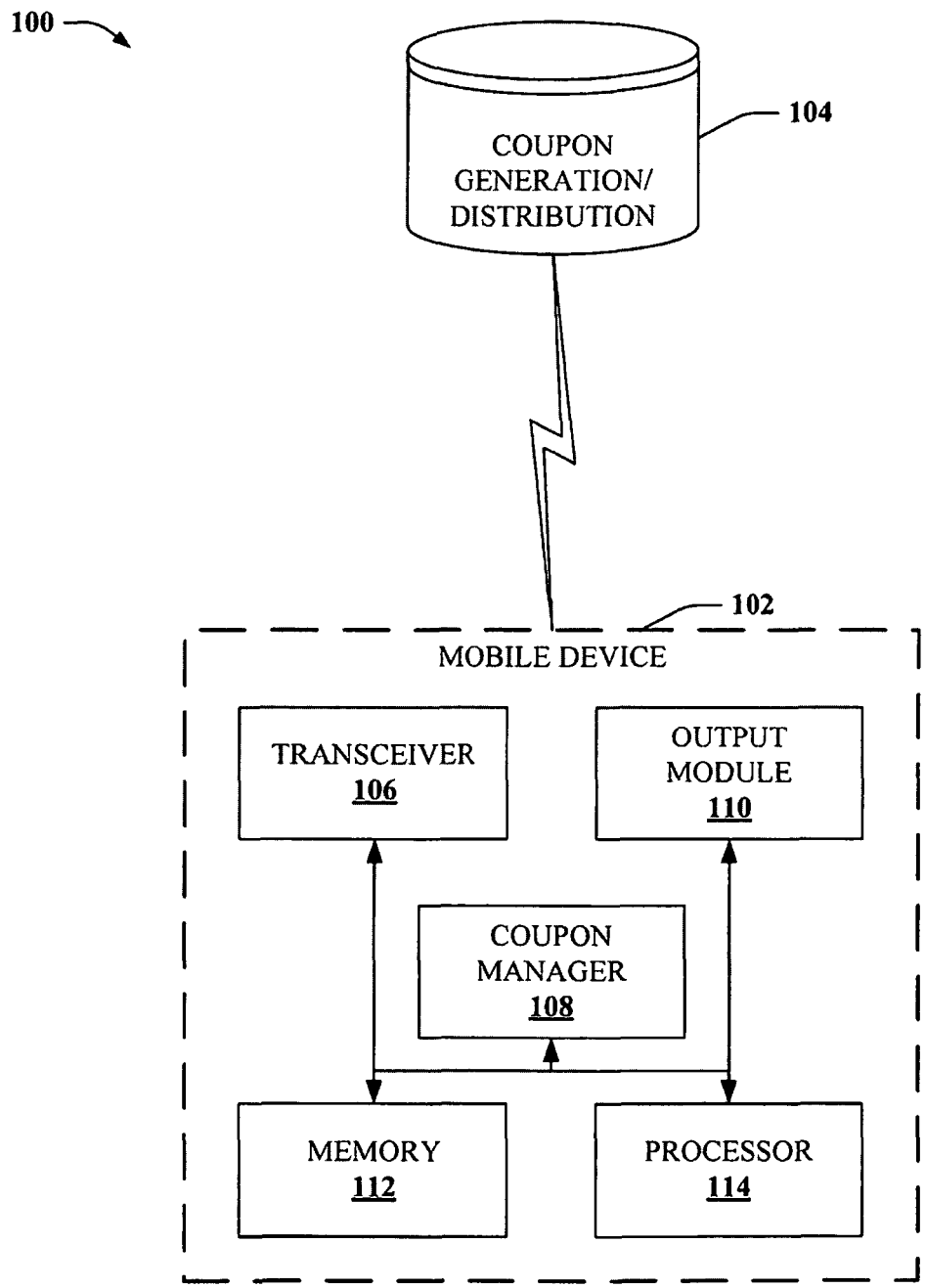
FIG. 1 illustrates a block diagram of an example system that provides management of a dynamic mobile coupon (DMC) in a mobile operating environment.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

In some aspects of the subject disclosure, a mechanism for managing electronic coupons configured for a mobile operating environment (e.g., a mobile coupon) is provided. For instance, a coupon management application at a mobile device can receive and organize one or more mobile coupons. In addition, the mobile coupons can be accepted, organized, sorted, and browsed as a function of characteristics of such coupons. The management application can extract data pertinent to a coupon supplier, an ID of the mobile coupon, a product, or service associated with the mobile coupon, a product or service manufacturer, a redeemable value, a qualifying redemption entity, or a dynamic characteristic and/or current state of such characteristic, or a suitable combination thereof or of the like. Such data can be displayed on separate tabs, menus, lists, slides, thumbnails, and the like, at a user interface of the mobile device. Further, animated programs and sub-programs can present additional data, for instance when a mobile device user selects a particular coupon at the user interface, or requests more information, and so on. Accordingly, extensive multimedia capabilities of electronic devices can be leveraged by a mobile device management application as described herein.

In general, coupons are often provided by a product or service manufacturer or supplier (e.g., clothing manufacturer, fast food chain, restaurant, grocery store, and the like), a marketing or advertisement entity representing such manufacturer/supplier, or even a third party coupon distribution entity. In contrast to paper coupons, electronic coupons can comprise computer applications implemented in software, electronic hardware, firmware, or a combination thereof, and as such can provide flexibility and multi-dimensional features with respect to paper counterparts. For instance, mobile coupons can take advantage of rich multimedia capabilities, such as computer generated graphics, computer animation, displayed text, rendered text, etc., digital audio features, tactile features (e.g., tactile sensory feedback), olfactory features (e.g., a pre-loaded scent coupled with a sprayer) and the like, of a mobile device. As a more specific example, an electronic coupon application can be played at a processing device (e.g., a cellular telephone, mobile device, laptop, personal digital assistant [PDA], etc.) and graphics, animation, sounds and tactile responses (e.g., various frequency vibrations, pulses, etc.) can be provided at user interfaces of such device.

Furthermore, electronic and/or mobile coupons can be transmitted via remote electronic communication mechanisms. For instance, a network can be utilized to broadcast electronic/mobile coupons from a distribution entity to various devices on a wired network, within a cellular site, or within wireless communication range of a WiFi or wireless transmitter, or other suitable wired and/or wireless transmitter. Furthermore, near field communication (NFC) implemented on a transceiver (e.g., an unobtrusive transmitter placed on a poster, sign, store window, etc.) can broadcast availability of a mobile coupon. The transceiver can provide the electronic coupon to a qualifying device that receives the broadcast (e.g., a mobile device having a coupon management application) and responds in a suitable manner.

In addition to the foregoing, electronic coupons can have dynamic characteristics. Aspects of such a dynamic electronic coupon (DEC), or dynamic mobile coupon (DMC) when compatible with an operating system of a mobile device, can therefore change as a function of determinable circumstances. As one particular example, a redeemable value of a DMC can depend on a time of day, proximity to a distribution device, a location of a target mobile device, account or profile information (e.g., user, vendor, supplier and/or retailer account/profile information), or a combination thereof or of like circumstances. Accordingly, a DMC can provide an effective mechanism to motivate consumer purchasing incentives based at least on a current state of the target mobile device.

A coupon management application for a mobile device, as described herein, can organize and provide an interface to a DMC according to static characteristics (e.g., sponsor, applicable product/service, redemption entity) as well as dynamic (e.g., variable) characteristics (e.g., concurrent redeemable value [CRV], applicable product/service, redemption location or entity, expiration date, single/double value status, and so on). As examples, variable characteristics can be displayed in a prominent fashion, highlighted, blinking, displayed in prominent colors or with pronounced indicia, augmented with graphical, auditory, and/or tactile feedback from a mobile device, or the like. Further, rules affecting the variable characteristic(s) can be displayed and/or announced. Alternatively, or in addition, if a determinable circumstance is detected that can affect a variable characteristic, the coupon management application can announce such an occurrence utilizing user interface features of the mobile device. Accordingly, a user can be apprised of impending circumstances affecting a DMC, and can respond/act accordingly.

In some aspects, a management application can enable a user to generate a profile that can uniquely identify the user, contain user history information (e.g., mobile coupons received, redeemed, shared amongst other users, and so on), and provide security for a user in respect to received and/or assigned mobile coupons. For instance, the management application can interface to a user profile server over a secure channel (e.g., secure socket layer [SSL]) to synchronize data within the user profile. A profile mediation entity can verify proposed activity utilizing a user profile, for instance, authorizing appropriate activity and denying inappropriate activity (e.g., from a spoofing device). The profile mediation entity can utilize encryption, security algorithms, username and password combinations, and/or the like, to verify user identity.

According to other aspects, server-side distribution, validation, and synchronization entities can facilitate and interface with a mobile device. In some such aspects, a management application can couple to network server entities via wired and/or wireless data exchange, or the application can be distributed across the server-side devices and mobile device (and, e.g., across other networked devices). As an example, a DMC distribution entity can receive mobile coupons and/or rules for generating such coupons from a coupon supplier. The DMC distribution entity can identify a mobile device by way of wireless data exchange, which can be utilized to determine whether the mobile device qualifies for a mobile coupon. For instance, a location of the mobile device, distance to the distribution entity, proximity to a retail location, user, product manufacturer, coupon sponsor or retail entity profile information, and so on, can be utilized as qualification criteria. The DMC distribution entity can then generate, distribute and/or associate a DMC with the mobile device if the mobile device qualifies based on such criteria. In some aspects, the mobile device can qualify for a DMC based at least in part on whether a coupon management application (or, e.g., a particular coupon management application provided by or associated with a DMC supplier) is loaded on the device.

A DMC distribution entity can further be associated with a coupon server that stores information pertinent to distributed coupons. The coupon server can interface with a coupon management application and synchronize pertinent data between the application and the coupon server. Thus, the coupon server can function as a backup and storage facility, as well as a reference to determine status, number, type, etc., of DMCs stored at a mobile device. In further aspects, a redemption entity can reference the coupon server to determine a status of a DMC presented for redemption. For instance, the coupon server can identify whether the presented DMC is active, evaluate and/or provide a variable characteristic of the mobile coupon, such as a CRV, an expiration date of the mobile coupon, etc., and/or obtain, evaluate, or provide rules determining dynamic conditions for the DMC.

According to one or more other aspects, a coupon management application can couple to other electronic devices that maintain product price/cost/compensation information or facilitate mobile device-related transactions. In at least one aspect, the coupon management application can present DMC ID information pertaining to a mobile coupon on a user interface display for optical scanning by such other electronic devices. In other aspects, the management application can send the DMC ID information to such other devices via wired and/or wireless data exchange (e.g., including Ethernet, cable, universal serial bus [USB], or other wired connection and/or near-field communication [NFC], Bluetooth® communication, ad-hoc wireless communication, licensed cellular frequency communication, unlicensed radio frequency communication, or the like, described herein or known in the art). In addition, the management application can obtain modified price/cost/transaction information pertaining to the product or service based on applying variable characteristics of the DMC (e.g., CRV) to the product or service.

In at least one aspect, a management application can utilize wireless communication capabilities of a mobile device to communicate with a mobile network. The application can provide information pertaining to mobile coupons stored at the mobile device, or associated with a user profile of the mobile device and stored at a remote location, to a network database via the mobile network. Thus, for instance, the application can identify mobile coupons pertinent to an invoice received at the mobile device and upload mobile coupon information to adjust an aspect of products or services listed on the invoice. An updated invoice can be received from the network database over the mobile network. The updated invoice can be provided to a point of sale device for application to a transaction, or an ID of the updated invoice can be supplied to the point of sale device if the network database is affiliated with the point of sale device and provides the updated invoice thereto.

According to other aspects, the management application can couple user loyalty cards with a mobile coupon user profile. The management application can provide an ID of the loyalty card in conjunction with a suitable mobile-related transaction. Thus, mobile transactions involving one or more mobile coupons, which also relate to a discount provided by the loyalty card, can be modified based on both the mobile coupon(s) and the loyalty card. In at least one related aspect, the management application can update a mobile coupon-related user profile maintained at a network server with loyalty card information. If a user scans the loyalty card at a device coupled with, or that can interface with, the network server, mobile coupons related to the user profile can be cross-referenced with products or services entered at the device. Thus, scanning the loyalty card can be utilized to access a mobile coupon account associated with the loyalty card, and determine whether mobile coupons in the account can be applied to a loyalty card transaction.

According to still other aspects, a profile interface (e.g., a webpage, mobile supplier site) is provided. The profile interface can enable a user, vendor, or retailer, or like entity, to generate a profile. The profile can identify an entity and contain preferences related to generation, distribution, reception, management, and/or redemption of a DMC. For instance, a vendor profile can include an ID of a vendor, coupons authorized by the vendor, rules for distributing or redeeming such coupons, and rules for determining a qualifying mobile device. As an additional example, a retailer profile can indicate permissible redemption times for a DMC (e.g., Monday through Friday during retail store business hours), terms, and conditions pertinent to redeeming the DMC, such as product limitations or supply restrictions, participating store locations, and so on. Profiles can be stored at a profile server that can interface with a DMC distribution server and a coupon synchronization server. Accordingly, a user/vendor/supplier profile can be referenced during DMC generation, distribution, management, sharing, redemption, or the like.

According to one or more other aspects, a management application at a mobile device can provide a social networking interface that pertains to sharing, ranking, trading and/or providing comments for dynamic electronic/mobile coupons. The management application can communicate with like applications at other mobile devices (e.g., by way of peer-to-peer wired or wireless communication, or communication through a network, such as the Internet, or a short message service [SMS] server of a mobile network, or the like). Users can trade or share mobile coupons by way of such communication, for instance, if a coupon is flagged for user exchange. In some aspects, mobile coupons can be sold amongst users utilizing the mobile device. A management application can interface to a third party payment provider (e.g., an online escrow entity) in conjunction with exchanging or trading mobile coupons. Coupon trading can also be conducted in conjunction with games, such as card games or the like wherein mobile device(s) facilitate coupon-related gambling, where allowed by prevailing law.

In accordance with further aspects, a management application can provide an interface for users to rank mobile coupons according to utility, value, desirability, 'coolness', uniqueness, impressiveness, or the like. The interface can link multiple devices, online social networking websites, and so on. Accordingly, the management application can obtain current rankings of coupons provided by a community of users. Coupons can be rated by aggregate responses among the general public of coupon users, by user trendsetters, in conjunction with a mobile device user's feedback, or combinations thereof. Accordingly, social ranking can be implemented in conjunction with trading and sharing of mobile coupons to provide popular user and/or celebrity trends in mobile coupons. As described, the subject disclosure provides for secure and efficient distribution, management, presentation, redemption, and/or sharing of DMCs to take advantage of the rich multimedia capabilities and commercial incentives thereof.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems, and apparatuses described herein are described in the context of providing dynamic mobile coupons in a mobile communication environment. One skilled in the art should appreciate that similar techniques could apply to other communication environments as well.

As used in this disclosure, the terms "component," "system," "module," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other suitable configuration. Additionally, at least one processor can comprise one or more modules operable to perform one or more of the steps and/or actions described herein.

Furthermore, various aspects are described herein in connection with a mobile communication device (or, e.g., a mobile device). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine-readable medium and/or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction, and/or data.

In addition to the foregoing, the word "exemplary" is used herein to mean serving as an example, instance, or illustration. Any aspect or design described herein as "exemplary"

is not necessarily to be construed as preferred or advantageous over other aspects or designs. Rather, use of the word exemplary is intended to present concepts in a concrete fashion. Furthermore, as used in this application and the appended claims, the term "or" is intended to mean an inclusive "or" rather than an exclusive "or." That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring now to the drawings, FIG. 1 illustrates a block diagram of an example system 100 that provides efficient management of a DMC at a mobile device 102, according to one aspect. Mobile device 102 can be communicatively linked with a coupon generation and/or distribution server 104 by way of a wireless transceiver 106. The server (104) can receive and/or generate a mobile coupon application that includes a DMC and, utilizing data received from the mobile device 102 and DMC rules stored at the server (104), determine whether mobile device 102 qualifies as a recipient of the DMC. Mobile device 102 can receive and execute the mobile coupon application to activate multimedia descriptive of the DMC. Accordingly, mobile device 102 can provide an interface to multimedia that enhances capabilities and commercial opportunities provided by coupons. As described herein, system 100 can enhance a mobile device (102) user's productivity and/or increase overall value of the DMC to the user.

A DMC can be exchanged between the mobile device 102 and the coupon generation/distribution server 104 in at least one of multiple ways. In one aspect, details pertaining to an available DMC can be provided to the mobile device 102. The details can include indicia identifying and/or describing the DMC (e.g., an ID of a DMC, a manufacturer, associated product/service, etc.). Transceiver 106 can be configured to transmit a unicast pull message (e.g., a request broadcast particularly for the coupon generation/distribution server 104) to request transmission of an application containing the DMC.

In another aspect, coupon generation/distribution server 104 can initiate, and transceiver 106 can be configured to receive, a unicast push message. The unicast push message can transmit the DMC application specifically to the mobile device. For instance, such a message can utilize information unique to the mobile device 102 (e.g., subscriber identity number, user profile information), and encode the transmission based on such information.

In still another aspect, the coupon generation/distribution server 104 can distribute the DMC application as a broadcast message based on a general characteristic associated with mobile device 102 or a user profile. Transceiver 106 can be configured to receive the broadcast push message and/or recognize such message based in part on the general characteristic. In such broadcast aspects, the DMC can be received by any suitable mobile device (102) configured to maintain a wireless link with the coupon generation/distribution server 104 and to decode the DMC application (e.g., a device having a coupon management module 108, as described below).

Mobile device 102 can include a coupon management module 108 (e.g., a coupon wallet) that can organize and provide an efficient interface to mobile coupons stored in memory 112 at the mobile device 102. For instance, the coupon management module 108 can utilize an 'inbox' and an 'outbox' arrangement. An active DMC (e.g., redeemable) can be grouped into the 'inbox', and an expired or redeemed DMC can be grouped into the 'outbox' (or, e.g., an 'expired' box). Accordingly, coupon management module 108 can organize a DMC as a function of a status of the DMC.

Additionally, coupon management module 108 can extract information from a coupon application (or, e.g., receive such information via the wireless link with coupon generation distribution server 104) pertinent to use and/or redemption of a DMC. For instance, a sponsor (e.g., entity responsible for redemption), manufacturer (e.g., source of a related product or service), retailer (e.g., product/server vendor), or other supply entity of the DMC, identified by the DMC or the coupon application, can be identified. Alternatively, or in addition, user profile information or user history information pertinent to DMCs can be provided at the management component. Such information can be displayed at an output component 110 of the mobile device 102. Output component 110 can include various suitable user interface modules and components, including a graphical display (e.g., thin film transistor TFT liquid crystal display LCD), audio speaker(s), tactile feedback mechanism (e.g., vibration device), or the like. It should be appreciated that multimedia technology utilizing audio, video and/or tactile components, as known in the art, can be applied to description, presentation, organization and management of the DMC at the mobile device 102.

Figure 2:
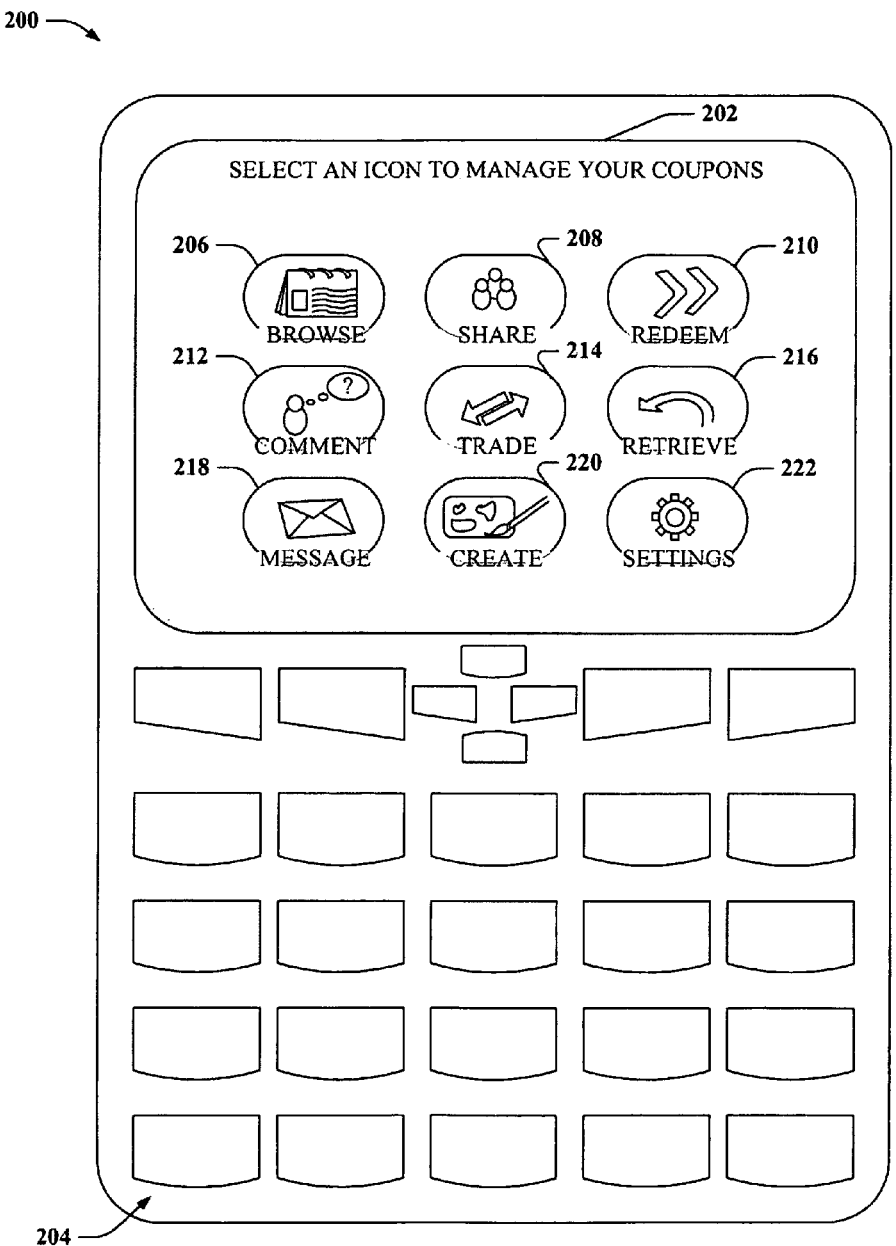
FIG. 2 depicts a block diagram of an example a user interface of a mobile device that provides management functions for a DMC, according to one aspect.

In some aspects, information pertinent to a DMC can be displayed on various tabs, lists, menus, toolbars, or the like, of a graphical display (e.g., see FIG. 2, infra). As one particular example, supplier information can be on a first tab, product/service information can be on a second tab, retail/redemption information can be on a third tab, user history information can be on a fourth tab, security or user/vendor profile information can be presented on a fifth tab, and so on. It is to be appreciated that various suitable arrangements for segregating data pertinent to a DMC and displaying such data on a graphical display, as known in the art or made known to one of skill in the art by way of the context provided herein, are contemplated and incorporated into the subject disclosure.

In accordance with other aspects, dynamic characteristics of a DMC can be presented by coupon management module 108 at output module 110. Such characteristics can include a redeemable value of the DMC, optionally including rules or standards for determining such value, expiration of the DMC, applicability for sharing or trading the DMC, concurrent social rank of the DMC, applicable product/service, a redemption location, distance and/or directions to the redemption location, and/or suitable rules for determining the foregoing dynamic characteristics at a given point. As an example, coupon management module 108 can present dynamic information (e.g., CRV) of all coupons stored in memory 112, or selected coupons (e.g., selected by user input at the mobile device 102) on a tab, list, page etc., of a graphical display. Alternatively, or in addition, rules pertinent to evaluating the dynamic characteristic can be provided at the output module 110 as well. Accordingly, a user is provided a concurrent state of the dynamic characteristic (e.g., a CRV of a dynamic redeemable value) and optionally a manner to affect the state.

As a specific non-limiting example of the foregoing, a DMC for a fast food restaurant can provide a discount off a purchase of a hamburger. In addition, the discount can be a nominal value (e.g., 50 cents) at a first time (e.g., during afternoon lunch hours), and an increased value (e.g., one dollar) at a second time (e.g., during evening dinner hours). Furthermore, the value can be further increased (e.g., to a menu price associated with the hamburger, in effect providing a free hamburger) if a user engages in a promotional or incentive-based activity. Examples of promotional or incentive based activities can include viewing an advertisement at a mobile device (or, e.g., another suitable device), forwarding an advertisement to a predetermined number of mobile device users (e.g., via peer-to-peer communication, e-mail, SMS, instant message [IM], and so on), sharing the DMC with other mobile users, providing a recommendation of the DMC, uploading to/downloading from a DMC social networking site, and so on.

Coupon management module 108 can identify and/or request rules/incentives for evaluating a dynamic characteristic (e.g., from a coupon application or from coupon generation/distribution server 104), and present the rules/incentives at output module 110 in conjunction with a concurrent state of the characteristics. Accordingly, a user can be apprised of a manner in which the dynamic characteristics are actively or passively affected, allowing the user to alter such characteristics as desired. To continue the above example, coupon management module 108 could display the CRV of the fast food coupon as 50 cents at 1 pm in the afternoon, and display, or provide a link for displaying, rules for affecting that value (e.g., redeeming the DMC during dinner hours, participating in promotional/incentive activity). Accordingly, a mobile device user is informed of a manner in which to maximize the redeemable value of the DMC.

According to one or more further aspects, coupon management module 108 can monitor dynamic characteristics (e.g., redeemable value, expiration date) associated with one or more DMCs stored in memory 112 and announce an impending change in such characteristic. For instance, determinable circumstances can be defined that establish a value, quantity, condition, etc., of the dynamic characteristics. Such circumstances can include, for instance, a location of mobile device 102 (e.g., determined by global positioning system [GPS] and/or derivative GPS technologies, mobile base station triangulation or the like, peer-to-peer ranging techniques, and so on), proximity of mobile device 102 to a redemption entity (not depicted), proximity of mobile device 102 to a DMC supplier's competitor (e.g., physical proximity to a competing store, accessing a competing entity's website), a time of day, expiration date of the DMC, or combinations thereof or of like circumstances. Coupon management module 108 can identify such circumstances and, where suitable, monitor such circumstances in conjunction with evaluating the dynamic characteristics. If a dynamic characteristic should change as a result of a determined circumstance, the change and optionally an effect of such change on the dynamic characteristic can be presented at output module 110.

As a specific example, a value of a DMC can increase if mobile device 102 comes within a predetermined proximity to a retail store competing with a supplier of the DMC (e.g., if McDonalds® is the supplier, the competitor might include Burger King®). Position and/or proximity of the competing retail store can be determined via a peer-to-peer ranging determination between mobile device 102 and a wireless transmitter at the competing retail store. For instance, if such a wireless transceiver broadcasts availability of mobile coupons, or advertisement material, etc., the broadcast signals can be utilized for the peer-to-peer ranging determination.

In other aspects, the DMC can include a file with a list of indicia identifying a position of the competing retail store or a list of such stores (or, e.g., other specific criteria defining circumstances that affect dynamic characteristics of a DMC). For example, the indicia can include GPS locations, latitude/longitude coordinates, mobile base station triangulation determinations, or a relative position(s) (e.g., distance and direction) to objects having a known location, such as one or more mobile base stations. By monitoring a location of mobile device 102 and/or by receiving suitable peer-to-peer wireless data or other location information pertinent to a competing retail store, coupon management module 108 can identify location and/or proximity to such competing retail store. When the location/proximity reaches a threshold value (e.g., identified by the DMC as a circumstance affecting redeemable value or some other dynamic characteristic), coupon management module 108 can announce an anticipated change in the dynamic characteristic, a concurrent state, an anticipated state, and/or reason (e.g., based on determining rules) for the anticipated change.

An announcement at the mobile device 102 can utilize any suitable feature of output module 110, as discussed above, or any suitable user interface feature of a mobile device 102 known in the art. Accordingly, impending changes and/or causes thereof can be provided by audio, video, graphical, and/or tactile features of the mobile device 102. Thus, by outputting when, why and/or how a dynamic characteristic of a DMC changes, system 100 can enable a device user to maximize a benefit provided by the DMC. To continue the McDonalds-Burger King example, if coupon manager 108 determines that mobile device 102 has come within 50 feet of a Burger King store, output module can announce that a CRV of a McDonalds DMC has increased from $1.00 to $2.00 for the next 30 minutes (in accordance with rules established by a vendor/supplier/retailer, etc. of the DMC).

It should be appreciated that mobile device 102 can be a standard compliant mobile device having memory 112, processor 114, a transceiver 106 and output module 110 (e.g., a user interface, graphical display, or audio speakers and associated software). In such a case, coupon manager 108 can comprise one or more software modules compatible with an operating system of mobile device 102, and loaded in memory 112 and executed by processor 114. In other aspects, coupon manager 108 can comprise hardware, software, and/or software in execution, and include one or more hardware, software or firmware components, or modules not included in standard compliant devices. It should be appreciated that standard-compliant is not limited to be construed as limited to any particular mobile device and/or mobile communication standard at any particular date; rather, any suitable standard is included in the meaning of mobile device standard and thus mobile device 102 includes any suitable mobile device in compliance with such a standard.

FIG. 2 depicts a block diagram of an example user interface (202, 204) of a mobile device 200 that provides management functions for a DMC. Mobile device 200 includes at least a graphical display 202 and various input devices 204 (e.g., buttons, switches, sliders, levers, tactile-responsive display such as a touch-screen, and the like). It should be appreciated that mobile device 200 can also include one or more audio speakers or a tactile feedback devices (e.g., vibration mechanism, such as a tactile transducer, dynamic tactile surface) as well as suitable control modules (e.g., software drivers) that provide an output at such speakers or devices (e.g., voice simulation software, pulsed vibration mechanism, etc.). Accordingly, mobile device 202 can provide a rich interface to multimedia associated with a DMC.

Graphical display 202 can include various icons (206, 208, 210, 212, 214, 216, 218, 220, 222) that provide access to diverse features of a coupon management module of mobile device 202. For instance, icon 206 can provide access to browsing features that organize, sort and search through mobile coupons stored at mobile device 202 as a function of characteristics of such coupons. For instance, browsing features can segregate mobile coupons as a function of vendor, supplier, manufacturer, retail entity, product/service, redeemable value, issue date, redemption date, previous user history, or a combination thereof or of the like. Once a mobile coupon is selected, a mobile coupon application can be executed to engage descriptive, informative, multimedia pertaining to the coupon, an associated entity (e.g., manufacturer) or a third party entity (e.g., an advertisement). The multimedia can be presented at the graphical display 202 or other output features of mobile device 202, as described herein. Accordingly, system 200 provides a mechanism to conveniently identify, locate, and present information pertaining to stored mobile coupons.

Icon 208 can provide access to sharing features associated with mobile coupons, including coupon sharing, purchasing, or gambling (where allowed by prevailing law) or a combination thereof. In addition, sharing features can incorporate social networking. For instance, the sharing features can provide aggregated comments submitted by a community of mobile users (e.g., utilizing a mobile network as a common interface) and/or online users (e.g., utilizing the Internet, or one or more web pages, as a common interface).

In addition, user interface 202 can include icons (210, 212) facilitating redemption of mobile coupons and providing comments and feedback to a coupon supplier, retail entity associated with a mobile coupon, or mobile coupon distributor, or a combination thereof. Additional icons (214) can provide trading functions. Such functions can enable a user to post (e.g., at a mobile user interface or Internet web page) a desired mobile coupon (e.g., identified by supplier, redemption value, coupon ID, and so on) and/or a mobile coupon offered in trade. The trading functions can facilitate offering and accepting a trade, and swapping traded mobile coupons among participating devices (200).

In addition to the foregoing, an icon (216) can provide retrieval of pertinent history information associated with one or more coupons. History information can include coupons received or accepted, coupons redeemed, relevant dates, redemption values, associated transactions, and so on. Additional icons (218) can provide messaging features enabling data, comments, or coupons to be sent from one mobile device 200 to another (200). Further, icons (220, 222) pertinent to establishing user settings and preferences of the management application, and for creating proposed coupons and submitting the proposed coupons to a supplier, redemption entity, coupon distributor, or the like, can be provided. It should be appreciated that various other icons related to management, organizational and functional features associated with mobile coupons can be provided by mobile device 200, as known in the art or made known to one of skill in the art by way of the context provided herein.

Figure 3:
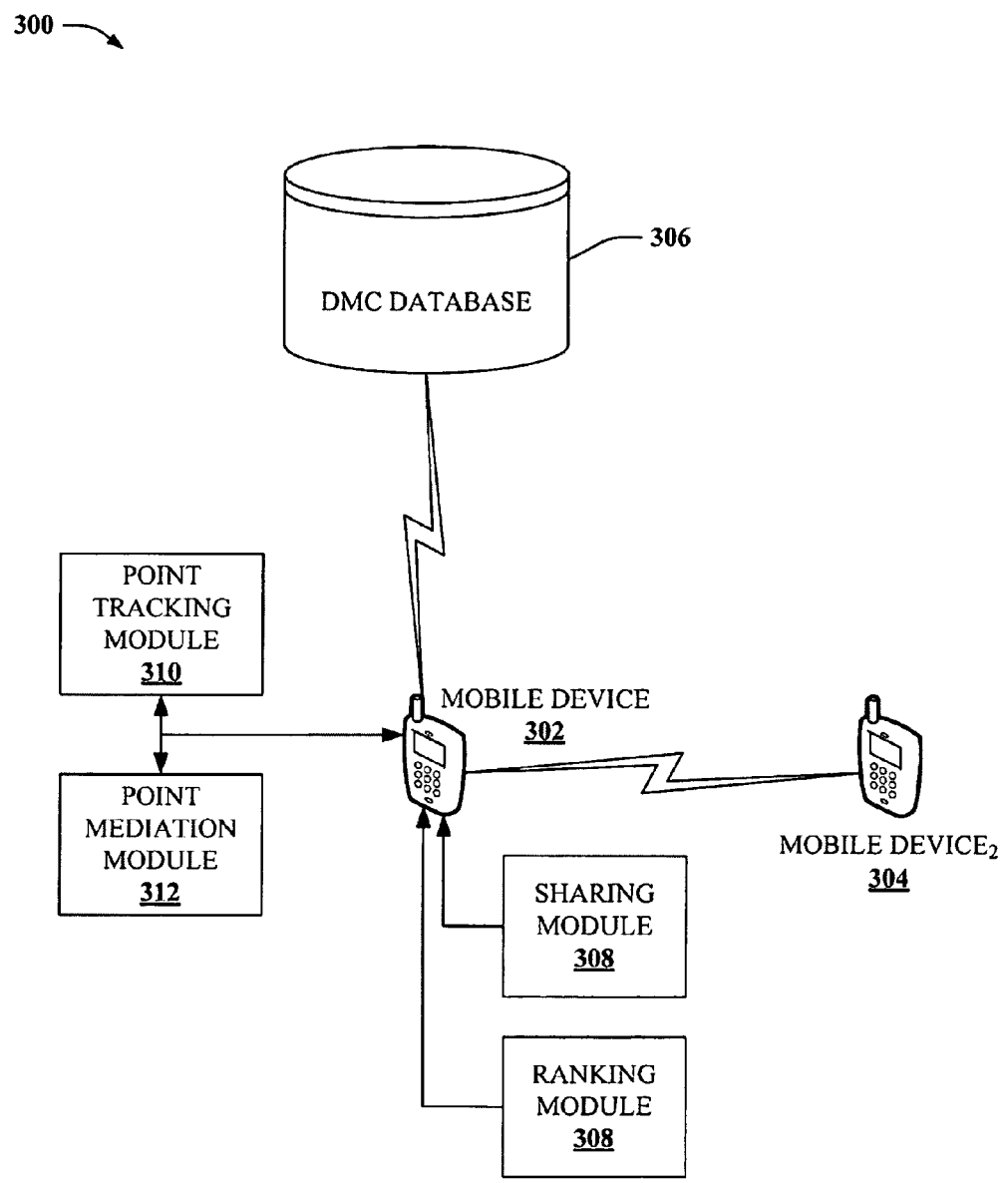
FIG. 3 illustrates a block diagram of a sample system providing social networking as one aspect of managing a DMC in a mobile environment, according to one aspect.

FIG. 3 illustrates a block diagram of a sample system 300 providing social networking in conjunction with use of a DMC in a mobile environment. System 300 can include a mobile device 302 that can exchange data with another device, mobile device$_2$ 304. The data exchange can be conducted via a peer-to-peer communication medium (e.g., Bluetooth® transmission, WiFi transmission, or the like) or utilizing an intervening network infrastructure, such as a mobile communication network, a wired and/or wireless Internet Protocol (IP) network, including the Internet, a web page of such a network, or the like.

Mobile device 302 and/or mobile device$_2$ 304 can form a wireless link with DMC database 306. In some aspects, DMC database 306 can be a networked device that communicates with mobile devices (302, 304) via a network (e.g., a mobile communication network, an IP-based network (e.g., the Internet, or an intranet), a local area network (LAN) device). In other aspects, DMC database 306 can be a stand-alone wireless transmitting device. According to still other aspects, DMC database 306 can be a combination of the stand-alone wireless transmitting device and the networked device.

DMC database 306 can be configured to securely synchronize with a coupon management application (not depicted, but see FIG. 1, supra) at a mobile device (302, 304). DMC database 306 can obtain and store information pertinent to one or more DMCs located at such devices. For instance, mobile coupon ID, status (e.g., active, redeemed, expired, etc.), sponsor, manufacturer, associated user profile, and the like can be obtained, updated, and/or stored through secure synchronization with the mobile device (302, 304). Accordingly, DMC database 306 can provide backup, restoration and security functions for DMCs.

In other aspects, DMC database 306 can provide and/or receive data pertinent to determining dynamic characteristics of one or more DMCs (e.g., a CRV), and evaluating a concurrent state of such characteristics. For instance, rules for evaluating DMC dynamic characteristics, determinable circumstances affecting such characteristics, and/or a concurrent state of such characteristics and circumstances, as described herein, can be obtained at DMC database 306. Such information can be stored at the DMC database 306. The information can be received from one or more mobile devices (302, 304) (e.g., pertaining to DMCs stored at/associated with such devices 302, 304) or from a DMC generation/distribution entity (not depicted, but see FIG. 1, supra). For instance, when a DMC is generated and/or distributed by such entity, the DMC database 306 can be updated with information pertinent to the generation/distribution. In addition, DMC database 306 can periodically re-synchronize to a mobile device (302, 304) to update a concurrent state of dynamic information. Accordingly, DMC database 306 can serve as a backup or repository for such dynamic information.

According to one or more other aspects, DMC database 306 can obtain profile information from a mobile device (302, 304). Profile information can be utilized to retrieve stored DMC information associated with the profile. For instance, if a DMC application at a mobile device (302, 304) becomes corrupt, the application can be replaced by synchronizing with the DMC database 306. DMC database 306 can also be coupled with a profile server (not depicted) that can create, secure, and/or maintain profiles. Accordingly, a status or authenticity of a user profile submitted to the DMC database 306 can be referenced with respect to the profile server. In addition, DMC database 306 can serve as an interface between a mobile device (302, 304) and a profile server. A user could, for instance, update user profile information at the profile server by way of the DMC database 306 (e.g., in lieu of a direct interface with a profile server).

In addition to the foregoing, system 300 can facilitate sharing of a DMC between mobile devices 302, 304. Sharing module 308 can involve copying a DMC, where permitted by rules of a DMC supplier, and forwarding the copy of the DMC from mobile device 302 to mobile device$_2$ 304, or vice versa. In some aspects, sharing module 308 can facilitate transferring the DMC from mobile device 302 to mobile device$_2$ 304, or vice versa. In still other aspects, sharing module 308 can transfer a first DMC(s) at mobile device 302 for a second DMC(s) at mobile device$_2$ 304 to facilitate trading DMCs. Furthermore, sharing module 308 can facilitate purchase of the DMC (e.g., securing payment in cash, credit, and/or other commodity) in conjunction with transferring the DMC between mobile devices 302, 304. In still other aspects, payment and trading of coupons can involve investment trading in such coupons, for instance, where a user purchases a DMC or group of DMCs (or, e.g., a share therein) and can receive a dividend in money earned by the DMC(s) (e.g., based on an increase in subsequent purchase price), or the like.

In accordance with other aspects, communication between the mobile device 302, 304 can involve one or more games implemented on the mobile devices. Sharing module 308 can hold a DMC(s) as stakes in such games, where a winner of a game can be awarded the DMC(s). Such aspects are limited by applicable law.

According to one or more aspects, a ranking module 310 can facilitate user evaluation of a DMC according to a relative scale. Ranking module 310 can receive input at mobile device 302 and assign that input as the user evaluation of the DMC. The input can include a number on a relative scale (e.g., scale from 1 to 10) comparing the DMC to other DMCs or to qualitative standard (e.g., poor, fair, average, good, great, etc.). Further, the input can include a review of the DMC provided as input at mobile device 302. User evaluation of the DMC can be stored by ranking module 310 at the mobile device (302), submitted to a social networking website, server, or the like (not depicted) on a data network, mobile network, and so on.

In accordance with still other aspects, ranking module 310 can reference information stored at remote mobile device (304) linked with mobile device 302 or coupled with a network (e.g., mobile network, the Internet, etc.). Such information can include an evaluation of one or more DMCs by a remote user or community of remote users. For instance, a social networking website can provide aggregated reviews and/or evaluations of one or more DMCs. The reviews and/or evaluations can be retrieved by ranking module 310 and provided to a DMC management module (not depicted, but see FIG. 1, supra) at mobile device 302. In addition, evaluations of trendsetters (e.g., celebrities) can be specifically highlighted at such DMC management module. Trendsetters can be individuals identified by a user of the mobile device, identified by a community of users, or the like.

System 300 can further provide frequent user points for a user of a DMC. Point tracking module 312 can determine receipt, redemption and/or sharing of a DMC, as described herein. Such activity can be cross-referenced with a point mediation server 314 that contains rules pertinent to accruing or redeeming frequent DMC user points. For instance, point tracking module 312 can accord a user one or more DMC user points for receiving a DMC, sharing the DMC with remote users (e.g., friends, family, socially networked individuals, and so on), and/or redeeming the DMC in conjunction with a transaction. User points can provide additional value in addition to commercial value provided by the DMC itself. For instance, a predetermined number of user points can result in one or more free coupons, or the like. Accordingly, system 300 provides backup and synchronization of a DMC, sharing, trading, and ranking of the DMC with one or more networked users, and accrual of frequent user points based on receipt, sharing, and/or redemption of the DMC.

Figure 4:
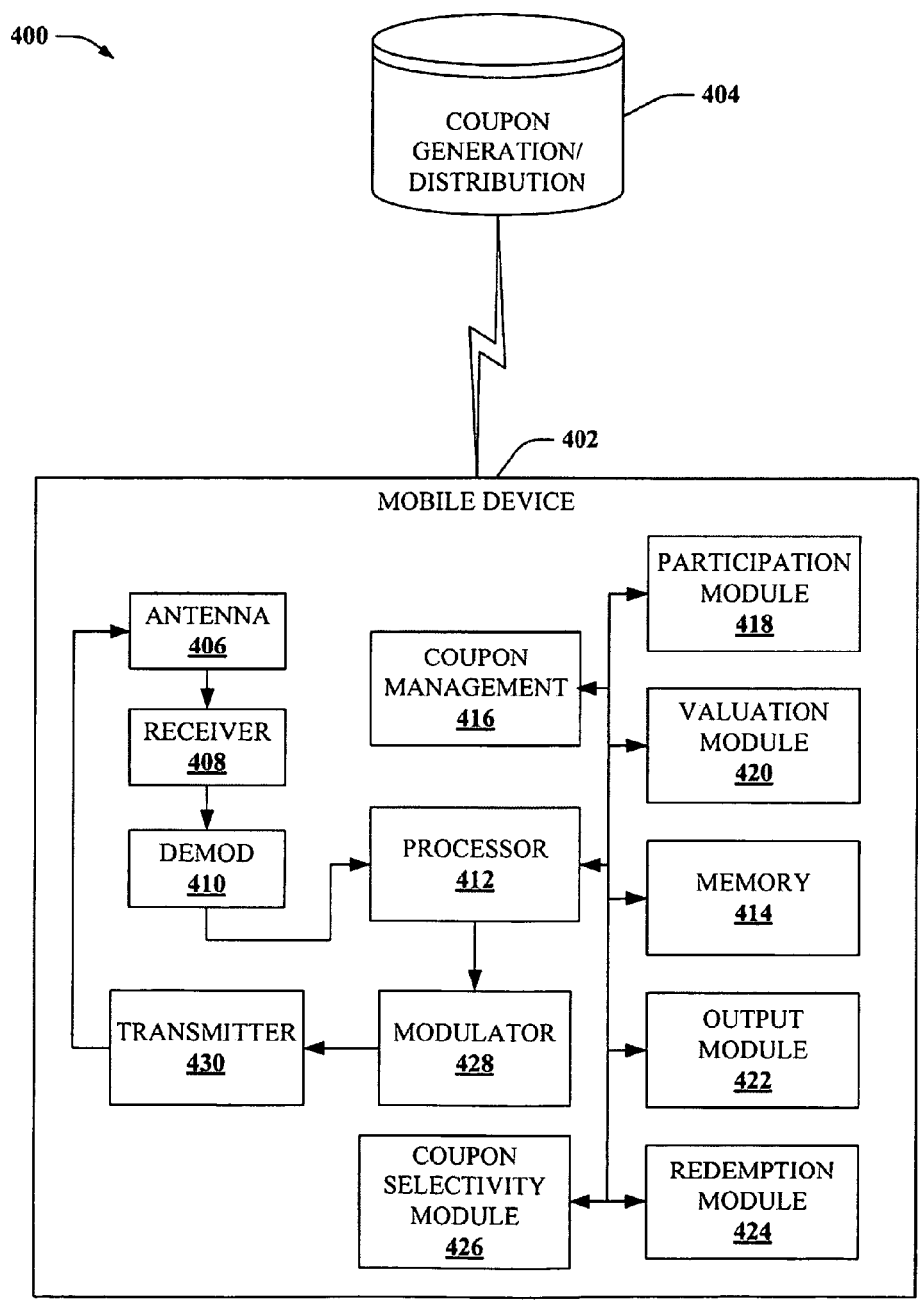
FIG. 4 depicts a block diagram of an example mobile device suitable for managing a DMC according to one or more aspects.

FIG. 4 illustrates a block diagram of an example system 400 that includes a mobile device 402 suitable for managing a DMC according to one or more aspects described herein. Specifically, mobile device 402 can manage one or more DMCs stored at such device. Receipt, organization, sharing, and/or redemption of the DMCs can be provided by the mobile device 402. Accordingly, a mobile device 402 as described herein can provide an efficient interface to such DMCs.

Mobile handset 402 includes at least one antenna 406 (e.g., a transmission receiver or group of such receivers comprising an input interface) that receives a signal (e.g., pertaining to voice call, data transfer, DMC value, and so on) and a receiver 408, which performs typical actions (e.g., filters, amplifies, down-converts, etc.) on the received signal. Specifically, antenna 406 can obtain a DMC from the DMC generation and/or distribution component 404 over a wireless link between such component 404 and the mobile device 402. Antenna 406, in conjunction with receiver 408 and/or transmitter 430 can receive the DMC utilizing a unicast pull message or a unicast push message or broadcast push message from the DMC generation/distribution component 404, as described herein.

Antenna 406 and receiver 408 can also be coupled with a demodulator 410 that can demodulate received symbols and provide them to a processor 412 for evaluation. Processor 412 can analyze information received by antenna 406 or a user input interface 420 of the mobile device 402, and/or generate information for transmission by a transmitter 426. Additionally, processor 412 can control and/or reference one or more components (406, 408, 410, 414, 416, 418, 420, 422, 424, 426, 428) of the mobile handset 402. Further, processor 412 can execute one or more modules, applications, engines, or the like (416, 418, 422, 424, 426) that comprise information or controls pertinent to accepting the DMC, organizing the DMC and/or displaying information pertinent to the DMC at a user interface 420, redeeming the DMC in conjunction with a transaction, or the like. Alternatively, or in addition, such modules (416, 418, 422, 424, 426) can comprise information or controls pertaining to sharing or trading a DMC with remote devices (not depicted), as described herein.

In some aspects, processor 412 can be configured to send a wireless broadcast via the transceiver that requests identification of an available DMC from a recipient of a wireless broadcast. In other aspects, processor 412 can be configured to receive a wireless signal via the transceiver, wherein the wireless signal indicates availability or unavailability of a DMC for the mobile device 402. Further, processor 412 can send a request for transmission of the DMC to the mobile device 402.

Mobile handset 402 can additionally include memory 414 that is operatively coupled to processor 412. Memory 414 can store data to be transmitted, received, and the like. Such data can be pertinent to receiving a DMC from DMC generation/distribution component 404 or determining a dynamic characteristic of such DMC. Alternatively, or in addition, the data can be pertinent to playing an advertisement application associated with the DMC (e.g., promoting a supplier, product or service, retail entity, and so on) at an output module 422 (e.g., a user interface) of mobile handset 402.

Mobile device 402 can include program modules pertinent to managing a DMC at mobile device 402. In one aspect, a coupon management module 416 can be configured to employ a coupon ID, a supplier, a product or service, a product/service manufacturer, a redeemable value, a redemption entity, or a combination thereof, as a characteristic for segregating and/or displaying DMCs at the mobile device 402. In other aspects, a participation module 418 can be configured to facilitate engaging or disengaging automatic downloading of available mobile coupons, wherein the engaging or disengaging is optionally based on a user profile. According to further aspects, a dynamic evaluation module 420 can be included with mobile device 402. The dynamic evaluation module 420 can display one or more dynamic characteristics at an output module 422 of mobile device 402 (e.g., a CRV, an associated product/service, or the like). The dynamic evaluation module 420 can, in some aspects, present rules for altering one or more dynamic characteristics of the DMC at the output module 422 of mobile device 402. In still other aspects, the dynamic evaluation module 420 can provide auditory, visual, or tactile indication or feedback, or a combination thereof, of an impending change in the dynamic characteristics of the DMC at the output module 422.

In addition to the foregoing, mobile device 402 can include a redemption module 424. The redemption module 424 can be configured to facilitate redeeming a DMC in conjunction with a transaction. In some aspects, the redemption module 424 can provide mobile coupon-related information to other devices. For instance, the redemption module 424 can provide a visual indication (e.g., a bar code displayed on a user interface display) and/or auditory indication (e.g., an auditory sequence associated with a DMC, a spoken name or ID of the DMC, etc.) of a unique ID of a DMC on the output module 422. Such indication can be utilized by a redemption entity (e.g., a point of sale device) to identify the DMC. Further, redemption module 424 can provide a wired and/or wireless electronic transmission of the unique ID to the redemption entity in conjunction with redeeming the DMC. Alternatively, or in addition, redemption module 424 can provide user profile information to the redemption entity. The redemption entity can then access a user profile stored at the mobile device 402 or maintained on a network database to identify mobile coupons associated with the user profile that are pertinent to a transaction. Such mobile coupons can be redeemed in conjunction with the transaction.

According to other aspects of the disclosure, redemption module 424 can facilitate management of mobile coupons and application of such coupons to mobile device-related transactions. The redemption module 424 can receive data (e.g., via any suitable wired and/or wireless data exchange) that identifies one or more products or services (e.g., from a point of sale device, a product price transmitter, a wireless interface of a retail store configured to provide product/service information to suitable mobile devices, and so on). Based on such data, mobile coupons associated with a user profile that are pertinent to such products/services can be identified, as described herein. A variable characteristic of such coupons can be applied to aspects of the products/services (e.g., price, rebate information, inter-product related discounts, multi-product related discounts, and so on). The updated aspects can be displayed at a user interface of the mobile device to inform a device user of availability of a mobile coupon for the product, and an effect of applying the mobile coupon to such product.

In addition to the foregoing, redemption entity 424 can be configured to obtain product or service information associated with a transaction or proposed transaction. For instance, products entered into a point of sale device can be forwarded to the mobile device and received at the redemption module 424. The redemption module 424 can identify or obtain mobile coupons associated with such products and send the point of sale device the mobile coupons, an ID of the mobile coupons, etc, to facilitate automatic application of variable characteristics of the mobile coupons to the products/services associated with the transaction. In at least some aspects, the redemption module 424 can couple directly to a back-end device (e.g., a network server, database or the like) that facilitates, manages, authorizes and/or participates in, etc., application of mobile coupons to transactions. The back-end device can provide an updated invoice containing modified transaction information (e.g., based on variable characteristics of applicable mobile coupons, such as CRV) to the mobile device, and forward such invoice to the point of sale device. Thus, application of mobile coupons to a transaction can be conducted automatically by mobile device 402.

Mobile device 402, in some aspects, can include a coupon selectivity module 426 that can be configured to condition acceptance of a mobile coupon application containing a DMC based at least in part on one or more determinable factors. For instance, acceptance of the application/DMC can be based on a distance to the DMC generation/distribution component 404, a location of the mobile device (e.g., determined by GPS, base station triangulation, peer-to-peer ranging, or the like), a location of a coupon redemption entity (e.g., a point of sale device or a retail entity associated with a mobile coupon), or a user profile (e.g., indicating a type or ID of coupons to be accepted at the mobile device 402), or a combination thereof. Accordingly, acceptance of the mobile coupon can be based on various predetermined circumstances stored and implemented at coupon selectively component 426.

Mobile handset 402 still further comprises a modulator 428, and a transmitter 430 that transmits generated signals (e.g., by processor 412 and modulator 428) to, for instance, coupon generation/distribution system 404, a base station, an access point, another access terminal, a remote agent, a point of sale device, etc. Although depicted as being separate from the processor 412, it is to be appreciated that valuation module 416 can be part of processor 412 or a number of processors (not depicted). As described, system 400 provides a mobile device 402 that can facilitate many desirable functions pertinent to managing, valuating, and/or redeeming a DMC.

Figure 5:
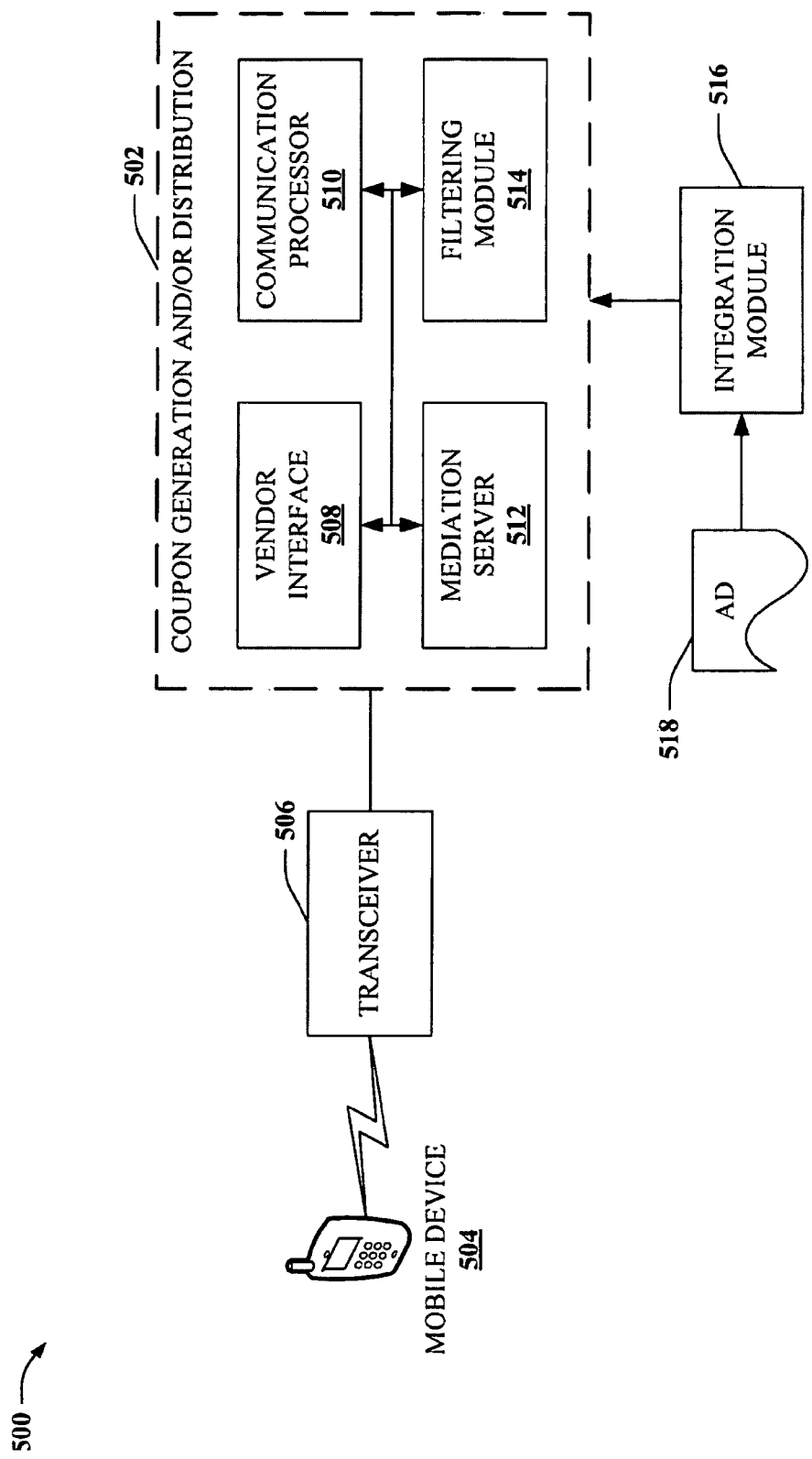
FIG. 5 illustrates a block diagram of a sample system for distributing and/or generating a DMC for a mobile device according to one or more aspects.

FIG. 5 illustrates a block diagram of a sample system 500 that can distribute and/or generate a DMC for a mobile device 504 according to aspects of the subject disclosure. Coupon generation and/or distribution system (coupon system) 502 can receive vendor rules for generating an electronic coupon. Alternatively, or in addition, the coupon system (502) can receive an electronic coupon that is generated by a vendor. The electronic coupon can be in the form of a software, hardware and/or firmware application, file, or like media, which can be played at an electronic device. Furthermore, when configured to be compatible with an operating environment of a mobile device 504, such electronic coupon can be termed a mobile coupon. According to particular aspects, such a mobile coupon can include dynamic characteristics, such as redemption value, applicable products or services, time(s) of redemption, redemption location(s), double, triple, etc., redemption value, and so on as described herein or known in the art.

Data exchange with one or more mobile devices (504) can be forwarded to a mobile device 504 by way of transceiver 506. For instance, unique or quasi-unique (e.g., unique with respect to devices in a cell site, or within wireless communication range of transceiver 506) aspects of the mobile device 504 can be utilized to transmit data specifically for such device(s) (504) (e.g., unicast message). In other aspects, a general characteristic(s) (e.g., one or more particular mobile operating systems, a predetermined mobile communication protocol, a DMC management application at the mobile device 504) of mobile device 504 can be utilized by transceiver 504 to broadcast data to multiple such devices. Information transmitted by system 502 and transceiver 506 can include a DMC application, information identifying a DMC, and/or information to qualify the mobile device for distribution of the DMC, as specified by a vendor.

Coupon system 502 can include a vendor interface 508. Vendor interface 508 can include a website, mobile device (504) application and access to a mobile network server (502), a direct network connection (e.g., wired connection to a network) to the coupon system 502, or the like. Vendor interface 508 enables a sponsor of a mobile coupon to update information pertaining to generation and/or distribution of such coupon. In some aspects, the sponsor can add rules for generation of one or more DMCs. In further aspects, the sponsor can utilize vendor interface 508 to update or delete such rules. In still other aspects, the sponsor can upload an electronic application that includes a pre-generated DMC by way of the vendor interface 508.

Additionally, a vendor can provide rules defining a number and/or type of mobile coupons to be distributed (e.g., via vendor interface 508). The vendor can further specify desired mobile device characteristics for selecting a mobile device for distribution. Such characteristics can include information in a user profile, user mobile coupon history information (e.g., stored at mobile device 504, or stored at coupon system 502 or other suitable network-based device), social networking participation pertaining to a mobile coupon, accumulated coupon user points associated with the vendor, or the like. Further characteristics can include a location of the mobile device 504, proximity of the mobile device 504 to coupon system 502, proximity to a retail location (not depicted), a time of day, whether mobile device 504 includes a certain mobile coupon management application and/or the like or a combination thereof.

According to one or more further aspects, instead of distributing a DMC to mobile device 504, coupon system 502 can receive a user profile or ID of such user profile from such device 504 and associate the DMC there with. Indicia pertaining to the association (e.g., a receipt, an ID of the DMC) that identifies pertinent aspects of the DMC can be forwarded in an electronic application to the mobile device 504. For instance, a description of a vendor (e.g., a source of the DMC, such as a manufacturer responsible for reimbursing the value provided by the DMC), a product or service, details pertaining to an applicable transaction (e.g., sale, lease, rental) at which a value of the DMC can be redeemed, and/or the like can be included in the indicia. In the instant case, mobile device 504 can redeem the DMC in conjunction with an appropriate transaction by providing user profile information to a redemption entity (not depicted). Accordingly, management of the DMC can also be conducted at coupon system 502 or like network-based components (e.g., see FIG. 6, infra).

In addition to the foregoing, system 502 can include a communication processor 510 that can identify one or more mobile devices (504) utilizing wired and/or wireless data exchange with such devices (504). Furthermore, the communication processor 510 can request data from a mobile device 504 pertinent to determining whether such device (504) qualifies for a mobile coupon (e.g., user profile information, coupon-related history information, and so on). According to particular aspects, communication processor 510 can forward pertinent information received from the mobile device 504 to a filtering module 514 that compares characteristics of the mobile device 504 (e.g., received via data exchange with communication processor 510) to predetermined characteristics associated with distribution of a mobile coupon.

According to further aspects, filtering module 514 can detect or calculate physical characteristics (e.g., time, location, proximity to one or more entities or locations, etc.) associated with the mobile device 504. Such physical characteristics can be used, at least in part, to qualify a mobile device 504 for receipt of a DMC. In addition to the foregoing, the physical characteristics can be employed in addition to or instead of data characteristics mined from a user or vendor profile, or general characteristics provided by a vendor, such as the first one hundred mobile devices identified by coupon system 502 for a given calendar day, or the like. As an example, the filtering module 504 can be configured to identify and employ a location of the mobile device, a distance to the mobile device, and/or a time of day as a qualifying characteristic(s). Such information can be in lieu of or in addition to user, vendor, supplier and/or retailer profile information, or other general criteria provided by a coupon vendor, for instance. If the mobile device 504 matches one or more provided characteristics (e.g., provided by the mobile coupon vendor), the qualifying device (504) or related user profile can be distributed and/or associated with a mobile coupon.

Coupon system 502 can optionally include a mediation server 512 configured to generate a DMC based on rules provided by a vendor. In other aspects, a DMC generated by the vendor can be stored at the coupon system 502, and distributed to or associated with a qualifying mobile device 504, as described above. Accordingly, coupon system 502 provides a versatile interface for a coupon vendor, enabling a vendor to upload a pre-generated mobile coupon and/or suitable vendor rules for generating mobile coupons that can be utilized to generate such coupons with requiring additional input from the vendor.

In one or more additional aspects, system 500 can incorporate and/or distribute advertisements (518), such as marketing information, commercials, and the like to mobile device (504). The marketing information can accompany a DMC distributed to the device (504), or can be transmitted as a separate electronic application. An integration module 516 can receive an electronic version of an advertisement 518 and bundle the electronic advertisement 518 with a DMC. Distribution of the DMC, therefore, can also deliver the advertisement to the mobile device 504. In some aspects, users can be given incentive to view the advertisement in conjunction with redeeming the DMC. For instance, a dynamic value or other variable characteristic of the DMC can be increased in a predetermined manner by viewing, sharing (e.g., amongst other mobile device users), trading, etc., the electronic advertisement (518). Such activity can be performed and processed at mobile device 504, or at another suitable device (e.g., computer, laptop, PDA, smartphone, networked device, and so on) employing a user account associated with a user of the mobile device that can process and upload a report of the activity to a related coupon account of the user at a suitable network entity (e.g., that can synchronize account activity with mobile device 504).

In other aspects, users can be provided coupon points for a particular coupon supplier upon viewing, sharing, trading, etc., an advertisement 518. The coupon points can provide additional value for a user of the mobile device 504. For instance, accumulation of a predetermined number of points can allow a user to select and receive (or, e.g., have their user profile associated with) one or more mobile coupons of a coupon supplier.

As described, system 500 provides a generation and/or distribution mechanism for mobile coupons. The system 500 provides a convenient mechanism for vendors to upload coupons for distribution as well as define rules for generating a number and type of coupons for distribution. Such a system (500) can be a powerful marketing tool for increasing exposure of a supplier with a market of mobile device (504) users.

Figure 6:
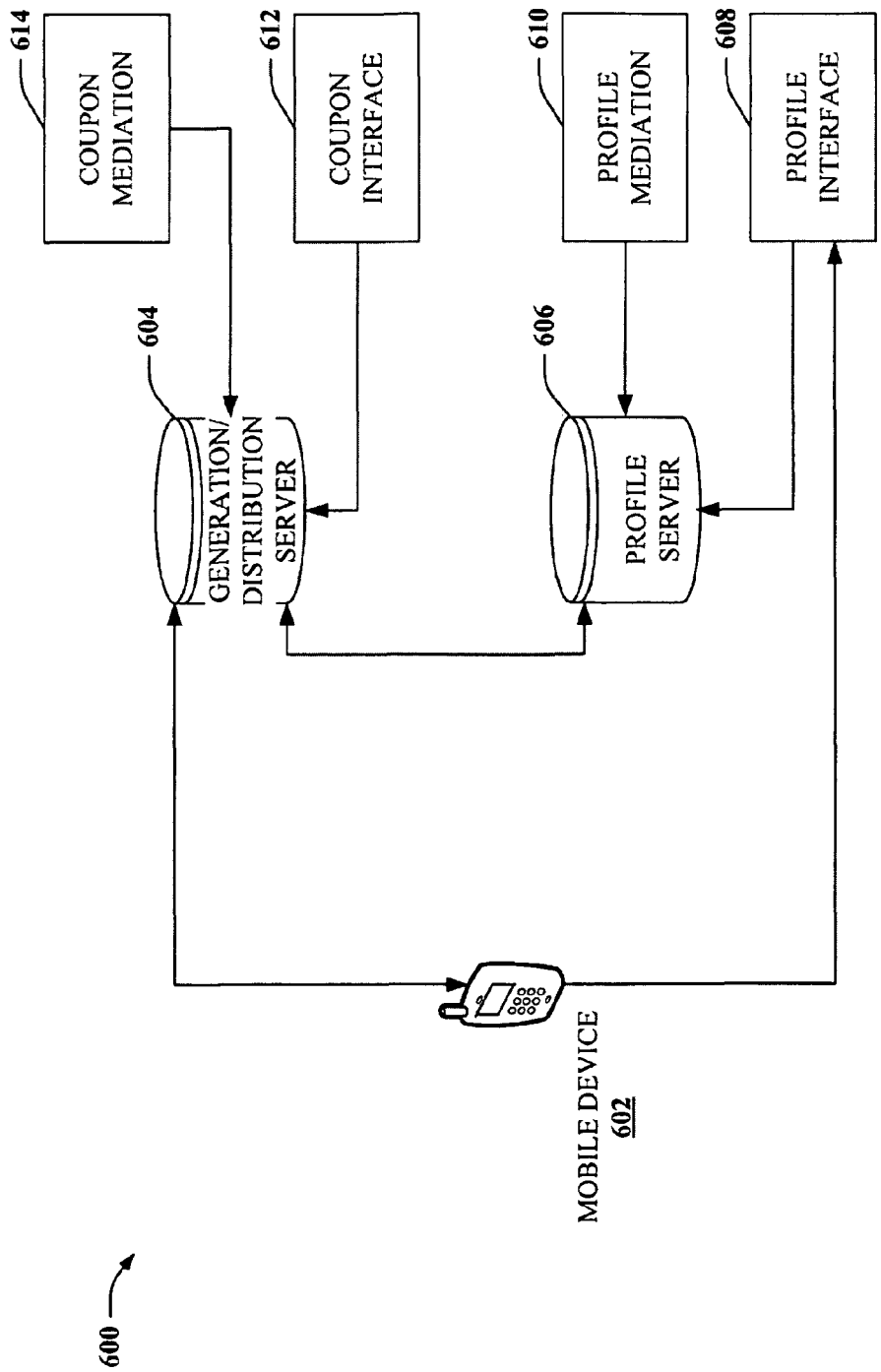
FIG. 6 depicts a block diagram of an example system that facilitates management of a DMC via user or vendor profile information, according to one aspect.

FIG. 6 depicts a block diagram of an example system 600 that facilitates generation, management, distribution, and/or redemption of a DMC via network-based user or vendor profile information. System 600 can provide security for transmission and use of mobile coupons. In addition, system 600 can provide convenience for users, vendors, retailers and the like in generating, utilizing and/or redeeming such coupons. Accordingly, system 600 provides a benefit for various entities associated with a mobile coupon industry.

Coupon server 604 can generate and/or distribute a DMC or an indication of a DMC to mobile device 602 by way of a wired and/or wireless link. Coupon generation can be conducted by way of a coupon interface 612. A vendor, for instance, can access coupon server 604 via the coupon interface 612 to generate a coupon, or provide rules for automatic generation of one or more mobile coupons at coupon server 604 (e.g., as described supra at FIG. 5). System 600 can further include a mobile coupon mediation 614 that can encrypt, digitally sign, password protect, etc., the mobile coupon. Access to data within or associated with the mobile coupon can be restricted to entities that provide appropriate security information. Otherwise, an application that contains data pertinent to the mobile coupon can remain encrypted, securing data stored within the application and a state of such data.

In some aspects, a coupon management application loaded on mobile device 602 can be configured to access the encrypted applications to extract and present information pertinent to the DMC. In such aspects, files transferred between coupon server 604 and mobile device 602 can be in an encrypted format to mitigate unauthorized use or redemption of the DMC. Data within the DMC application (e.g., a media file, redemption information, supplier or product/service information, CRV information, rules for determining the CRV, etc.) can be extracted by the coupon management application (e.g., via an encryption key provided to such management application), but the stored data itself can be hidden, maintained within an aggregated data file, or the like.

System 600 can also include a profile server 606 that can store and provide reference to user, vendor, retailer, coupon, etc., profiles. For instance, profile server 606 can provide profile information (e.g., ID information associated with an entity, such as a user, vendor, retailer, and so on) to the coupon server 604 in conjunction with receipt, generation, and/or distribution of a mobile coupon. Accordingly, system 600 can provide security at least by referencing an ID of a user with an ID stored in a profile.

As examples to illustrate the foregoing, if a vendor attempts to create, update, or delete a DMC or rules for generating the DMC stored at coupon server 604, the coupon server can reference a vendor profile stored at profile server 606 to verify identity of the vendor. Likewise, if a user attempts to request or receive a DMC from coupon server 604, the coupon server can submit a request to the mobile device for user ID information, which can be cross-referenced at the profile server 606. According to still other aspects, an identity of a retailer (not depicted) attempting to authorize redemption of a DMC can be cross-referenced at the profiler server 606, in addition to an ID of a user presenting the DMC for redemption.

Profiles can be created, updated, and/or deleted at profile server 606 by way of profile interface 608. The profile interface 608 can be a web-page interface to a profile server 606 at an IP network, or a mobile network interface (e.g., a browser on a mobile device) to a profile server 606 on a mobile network (e.g., a core network component, a mobile supplier's network component). A profile mediation component 610 can digitally sign, encrypt, or encode, etc., a profile. Keys for encryption/decryption can be stored at profile mediation 610. Access to a profile, for instance to create, update, or delete a profile, or in conjunction with generation, distribution, sharing or redemption of a DMC, can be restricted to entities that are able to provide appropriate security information as determined by profile mediation 610 (e.g., a proper username or password generated at profile creation).

According to one or more further aspects, coupon server 604 can facilitate generation (or, e.g., receipt), and network-centric redemption of a DMC. A qualifying mobile device 602 can be associated with the DMC as specified by a sponsor/vendor of the DMC. Pertinent information pertaining to the DMC, describing a manufacturer, redeemable value, applicable products or services, rules for establishing and evaluating dynamic/variable characteristics of the DMC, and so on, can be transmitted to the mobile device 602. Further, coupon server 604 can receive user profile information from the mobile device 602. The user profile information can be verified by referencing profile server 606 and/or profile mediation 610. If verified properly, an ID of the DMC can be associated with and assigned to the user profile.

To redeem a DMC associated with or assigned to a user's profile, mobile device 602 can simply present the user profile to a retail entity (not depicted) in conjunction with a transaction. The retail entity can provide the user profile to coupon server 604 in conjunction with details of the transaction. Coupon server 604 can reference profile server 606 to verify authenticity of the user and determine whether the user profile has any mobile coupons associated with such profile. If a mobile coupon is associated with the user profile, qualifying transaction information associated with the mobile coupon (e.g., stored at coupon server 604) can be extracted from the coupon and referenced against the transaction information provided by the retail entity. If the DMC is valid with respect to the transaction, the value of the coupon can be refunded to an account associated with the user profile, in effect reimbursing the user the redeemable value of the DMC. Accordingly, system 600 can provide device-based redemption (e.g., where a DMC is transmitted to the device) or network-based redemption (e.g., where an indication of the DMC, describing pertinent terms, conditions, etc., is transmitted to the device), or a combination of both. System 600 can also provide security by utilizing encryption/decryption, random or function-based coding, or the like, in conjunction with coupon generation and profile generation. Accordingly, system 600 can help preserve integrity and value of mobile coupons to mitigate unauthorized exploitation of such coupons.

The aforementioned systems have been described with respect to interaction between several components, modules, and/or electronic interface functions. It should be appreciated that such systems and components/modules/functions can include those components or sub-components specified therein, some of the specified components or sub-components, and/or additional components. For example, a system could include mobile device 102, coupon generation/distribution system 104, participation module 418, valuation module 420, and integration module 516, or a different combination of these and other components. Sub-components could also be implemented as components communicatively coupled to other components rather than included within parent components. Additionally, it should be noted that one or more components could be combined into a single component providing aggregate functionality. For instance, communication processor 510 can include filtering module 514, or vice versa, to facilitate identifying determinable characteristics pertinent to selecting a device and exchanging data with the device to compare the characteristics by way of a single component. The components may also interact with one or more other components not specifically described herein but known by those of skill in the art.

Furthermore, various portions of the disclosed systems can include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems more adaptive as well as efficient and intelligent.

It is to be understood that the embodiments described herein can be implemented in hardware, software, firmware, middleware, microcode, or any combination thereof. For a hardware implementation, the processing units can be implemented within one or more ASICs, DSPs, digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Referring to FIGS. 7-10, methodologies relating to managing a DMC in a mobile environment are provided. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 7:
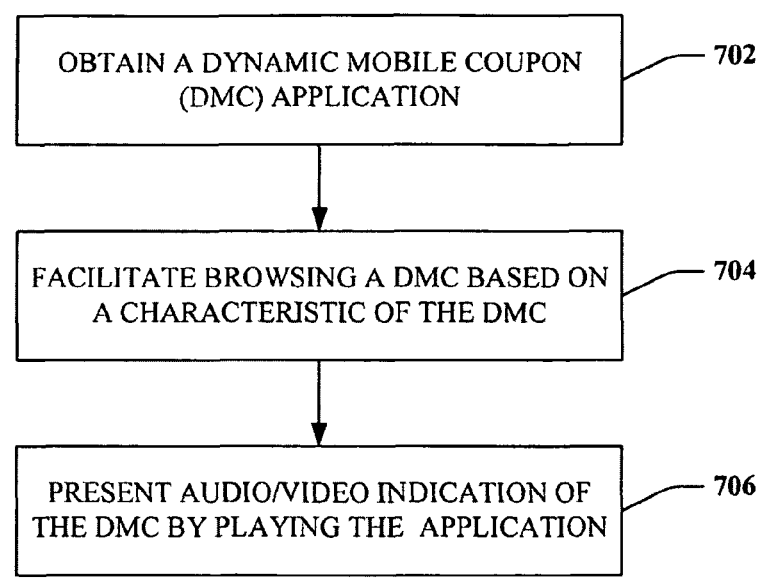
FIG. 7 illustrates a flowchart of a sample methodology for providing management of a DMC at a user interface of a mobile device, according to one aspect.

FIG. 7 illustrates a flowchart of a sample methodology 700 for providing management of a DMC at a user interface of a mobile device. At 702, method 700 can obtain a DMC application. The application can include media for presenting information pertinent to a DMC at a user interface of a mobile device (e.g., cellular telephone).

The DMC application can be obtained, for instance, from a coupon generation and/or distribution entity (coupon entity) configured to communicate wirelessly, or by way of a wired and wireless connection. Such coupon entity can broadcast the DMC application (or, e.g., availability thereof) to suitable devices in range of wireless communication. Alternatively, the coupon entity can transmit the DMC application to a particular mobile device (e.g., utilizing a unicast message). In some aspects, such transmission can be based on a request submitted by the mobile device to the coupon generation or distribution entity (e.g., utilizing a unicast pull message). It should be appreciated that the coupon entity can be a networked device (e.g., a mobile base station) or a stand-alone device (e.g., an unobtrusive transceiver device located at a retail store, a checkout counter, a poster, billboard or like advertisement, or a combination thereof or of the like).

At 704, method 700 can facilitate browsing the DMC based on a characteristic of the DMC. Browsing can be conducted at a graphical display of a mobile device user interface, for instance. As one example, icons can provide access to various organizational features at the mobile device. Such icons can facilitate searching, sorting, accessing detailed information, sharing, trading, and/or redeeming the DMC, requesting one or more additional DMCs from a coupon entity, providing feedback and/or comments pertaining to the DMC, and/or the like. Characteristics associated with the DMC can be utilized to segregate the DMC from other DMCs. For instance, a DMC can be segregated based on manufacturer, product/supplier (e.g., all pizza-related coupons), redeemable value (e.g., all buy-one-get-one free coupons), terms or conditions (e.g., expiration date), or a combination thereof or of like characteristics (e.g., described above). Further, browsing, searching, and so on can be conducted based on any suitable characteristic. As a more specific example, method 700 can support browsing based on information pertinent to the DMC (e.g., DMC supplier, applicable product/service, product/service manufacturer, participating retail entity and/or location, terms and conditions pursuant to redeeming the DMC, dynamic characteristics of the DMC, a manner to evaluate such characteristics, and/or coupon status, etc.).

Browsing can also be conducted based on status of a DMC. For instance, an active DMC, available for redemption, can be maintained in an "inbox." In contrast, expired or redeemed DMCs can be maintained in an "outbox." Accordingly, browsing a DMC as a function of status can readily be accomplished by looking within an inbox or outbox.

At 706, method 700 can present data concerning the DMC by playing the application, once selected, at a user interface of a mobile device. As a particular example, the application can include an audio-visual media file that can be displayed, announced, and/or played at a user interface of a mobile device. The media can provide pertinent information associated with the DMC. In one example, a product or service can be identified to which the DMC provides a redeemable value. Additionally, location of a redeeming entity (e.g., participating retail store) can be included with such media. Furthermore, dynamic characteristics can be presented, along with rules for evaluating such characteristics. In still other examples, an anticipated change in a dynamic characteristic (e.g., CRV) can be presented if such a change is impending. In general, information displayed can include a DMC supplier, applicable product/service, product/service manufacturer, participating retail entity and/or location, terms and conditions pursuant to redeeming the DMC, dynamic characteristics of the DMC and/or a manner to evaluate such characteristics, and so on. As described, method 700 provides an efficient way to receive, organize, and present information pertinent to dynamic mobile coupons at a user interface of a mobile device.

Figure 8:
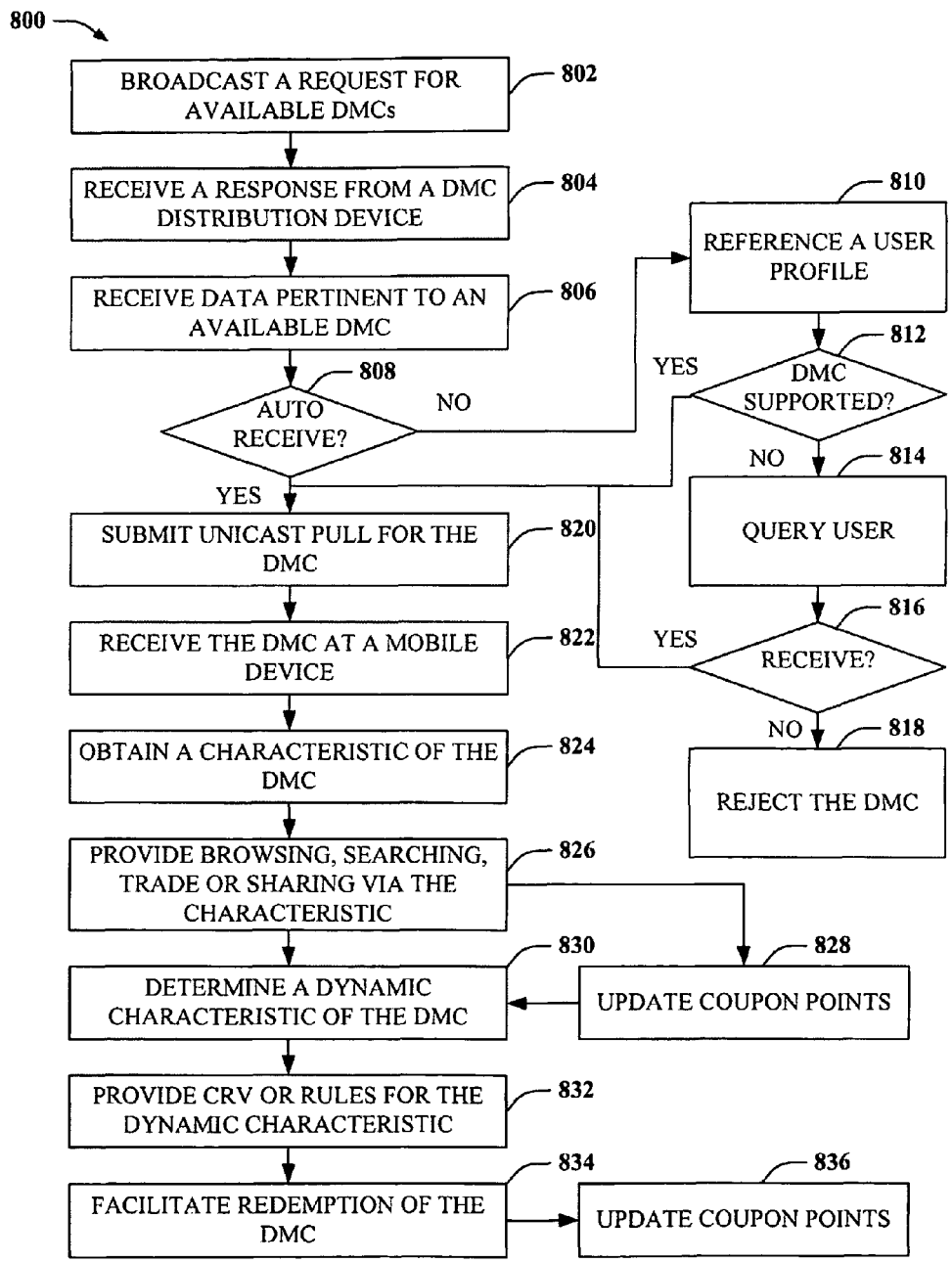
FIG. 8 depicts a flowchart of a sample methodology for receiving, filtering, sharing, and/or redeeming a DMC according to a particular aspect.

FIG. 8 depicts a flowchart of a sample methodology 800 for receiving, filtering, sharing and/or redeeming a DMC according to particular aspects. At 802, method 800 can broadcast a request for an available DMC. The broadcast can be over a licensed frequency (e.g., cellular), unlicensed frequency (e.g., WiFi-type frequency), or a combination of both. In addition, the broadcast can utilize a particular protocol expected by a DMC distribution device. At 804, method 800 can receive a response to the broadcast. The response can be, for instance, from a DMC distribution device having received the broadcast.

At 806, method 800 can receive data pertinent to an available DMC (e.g., from the DMC distribution device). At 808, a determination can be made as to whether an auto-receive flag has been set. If the auto-receive (e.g., an "opt-in" flag of a coupon management application) flag is set to receive, method 800 can proceed to 820. If the auto-receive flag is not set, or optionally no flag exists, method 800 can proceed to 810 where a user profile is referenced. By referencing the user profile, method 800 can determine whether the available DMC is supported at the user profile. If the available DMC is supported, method 800 can proceed to 820, if the available DMC is not supported at the user profile, method 800 proceeds to 814 where a query is presented, requesting input as to whether the available DMC should be downloaded, received, etc. If a response to the query indicates the available DMC can be downloaded, method 800 can proceed to 820. If the response instead indicates the available DMC is not to be downloaded, method 800 can proceed to 818 where the DMC is rejected.

At 820, method 800 can submit a unicast pull message to receive the DMC application. At 822, the DMC is received at a mobile device. The DMC application can be received as a result of a unicast push directed to the mobile device (e.g., in response to the unicast pull message requesting the DMC), or as a result of a broadcast push that that transmits the DMC application.

At 824, method 800 can obtain a characteristic of a received DMC. The characteristic can be extracted from a DMC application containing the DMC, or from a transmission sent by a transmitting entity (e.g., a DMC distribution entity). A suitable characteristic can include a product or service associated with the DMC, an ID of the DMC, a product/service manufacturer, a DMC supplier, a participating retail entity (e.g., stocking the product/service and providing it in conjunction with a transaction), suitable terms or conditions associated with redeeming the DMC, or a combination thereof or of like characteristics pertinent to generation, distribution, and/or redemption of the DMC. At 826, browsing, searching, trading, sharing and/or redemption of the DMC is provided based at least in part on the characteristic of the received DMC. At 828, coupon points (e.g., associated with a DMC supplier, a manufacturer, a retailer, etc.) can be updated based at least in part on receipt of the DMC.

At 830, method 800 can determine a dynamic characteristic of the DMC. Dynamic characteristics can include pertinent redemption information, such as a concurrent redeemable value, an applicable product/service, a participating retail entity, and/or terms or conditions pursuant to redemption (e.g., time of redemption, mobile device location, coupon-related user history, consumption of an advertisement associated with the DMC, sharing/trading/recommending the DMC to other members of a social group or social network, redemption of the DMC by other members of the social group/network, and so on). In addition, a suitable dynamic characteristic can include incentive activities, such as viewing associated advertisement or marketing information included within DMC application, sharing the advertisement/marketing information with other mobile device users, sharing the DMC application with other mobile device users, providing a favorable review to the DMC, or supplier/manufacturer/retailer, or the like.

At 832, a CRV associated with the DMC is presented. Alternatively, or in addition, rules for evaluating the CRV are also presented, for instance, to provide an opportunity to increase the CRV according to such rules prior to redemption. At 834, redemption of the DMC is facilitated. Redemption can occur by submitting an ID, or like identifier, of the DMC to a redeeming entity (e.g., optionally in addition to security information that can be utilized to authorize the DMC, such as a username and password, security key, encryption key, or the like). In some aspects, redemption can occur by submitting a user profile in conjunction with completing a transaction (e.g., where the redeeming entity forwards the user profile to a network-based redemption entity). Submission of the DMC or user profile can be accomplished via graphical display, auditory announcement, or wireless transmission, or a combination thereof.

As an example of the foregoing, a device that provides price/cost/transaction information of a product or service can coupled to via a wired and/or wireless connection. Data identifying the product or service can be obtained and referenced against DMCs associated with a user profile (e.g., stored at a mobile device, stored at a network server, or both). If a DMC can be redeemed in a transaction involving the product or service, updated cost/price/transaction information based on applying a variable characteristic of the DMC (e.g., CRV) can be automatically output. Thus, a device user can be apprised of updated transaction information of products/services based on DMCs associated with the user's account.

According to other aspects, product or service information associated with a transaction or proposed transaction can be received. The information can be utilized to identify DMCs applicable to such a transaction. Suitable DMCs can be uploaded to a back-end server (e.g., a network server or database) via a link to a mobile communication network (e.g., a wireless communication with a cellular base station). An updated invoice can be received reflecting modified transaction information based on applying suitable DMCs to the transaction. The updated invoice can be provided to a point of sale device to facilitate completing a modified transaction, reflecting characteristics of the DMC(s).

At 836, method 800 can update user coupon points based on redemption of the DMC. For instance, coupon points supported by a manufacturer, coupon sponsor, and/or retail entity pertinent to the DMC and/or its generation, distribution or redemption, can be updated. As described, method 800 provides a flexible mechanism to organize and manage functions pertinent to a DMC. Suitable functions, such as providing security, receiving a DMC, evaluating dynamic characteristics thereof, interfacing with a device user, redeeming the DMC, managing coupon points, etc., provide convenience to DMC users as well as market exposure to DMC providers. Further, method 800 can provide a rich and dynamic experience for a DMC user, increasing user efficiency and interest in the DMC and associated supplier(s).

Figure 9:
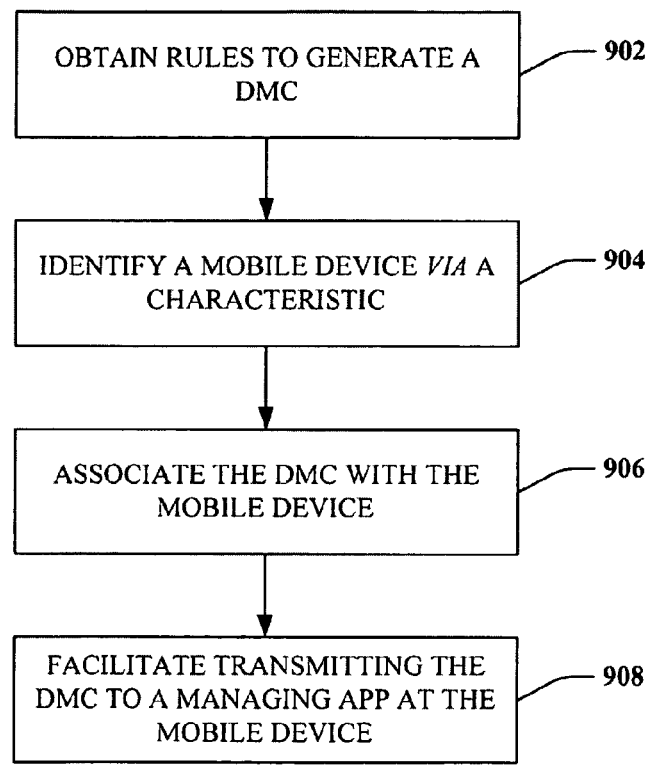
FIG. 9 illustrates a flowchart of a sample methodology for facilitating distribution and management of a DMC in a mobile environment, according to one aspect.

FIG. 9 illustrates a flowchart of a sample methodology 900 for facilitating distribution and management of a DMC in a mobile environment. At 902, method 900 can obtain rules for generating a DMC. The rules can be provided by a sponsor of the DMC. Further, the rules can specify a number of DMCs to generate, a manner in which to identify and qualify recipients of the DMC and/or determine static and dynamic aspects of the DMC and how to evaluate such aspects, as described herein. At 904, method 900 can identify a mobile device via a characteristic(s). Such characteristic(s) can be identified by the rules obtained at reference number 902. In some aspects, the mobile device is identified at least in part by way of wireless data exchange with such device. The wireless data exchange can provide a user profile associated with the mobile device, indicate prior DMC history where suitable, or like information. According to some aspects, determinable circumstances, such as mobile device position, proximity to one or more entities (e.g., a participating retail location), a time of day, or the like, can be utilized as an identifying characteristic.

At 906, method 900 can generate a DMC for the mobile device, optionally based on the mobile device characteristic(s). At 908, method 900 can synchronize with a DMC management application at the mobile device. The generated DMC can be transmitted to the DMC management application by way of a wireless or wired and wireless link with the mobile device. Redemption of the DMC can be initiated by providing an ID of the DMC in conjunction with engaging in a qualifying transaction.

Alternatively, or in addition to the foregoing, an indication of the DMC, for instance providing information pertinent to establishing a value of the DMC and redeeming the DMC, can be transmitted to the mobile device. The generated DMC can be updated to a server device, and associated with a user profile. Redemption can then be initiated by providing user profile information in conjunction with a qualifying transaction (e.g., identified within the DMC). As described, method 900 provides a network-based solution for generating and distributing a DMC based on characteristics associated with a recipient mobile device. Accordingly, distribution can be restricted to selected mobile devices and/or contemporaneous information determined about such devices.

Figure 10:
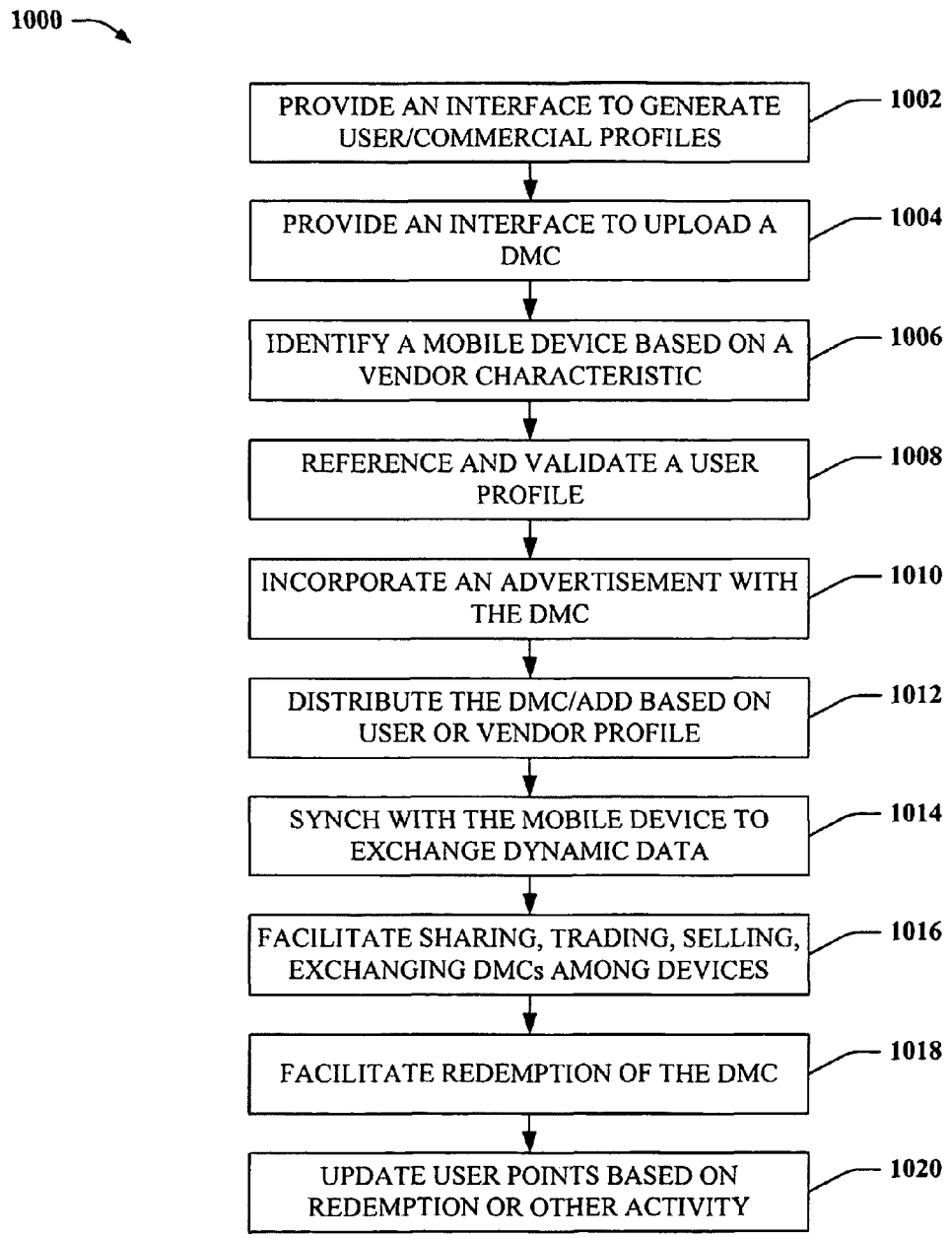
FIG. 10 depicts a flowchart of a sample methodology for generating, distributing and/or redeeming a DMC according to one or more additional aspects.

FIG. 10 depicts a flowchart of a sample methodology 1000 for generating, distributing and/or redeeming a DMC according to additional aspects. Method 1000, at 1002, can provide an interface to generate a DMC profile. The interface can be a web page, a mobile application, or the like. The interface can enable a user, vendor, or supplier of a DMC, or a manufacturer or retailer of products pertinent to the DMC, to create a suitable profile (e.g., user profile, vendor profile, supplier profile, etc.). A profile can be utilized at least to identify and/or verify electronic communication purportedly submitted by a creator of the profile (or, e.g., an agent thereof). In addition, a profile can specify preferences with respect to generation, distribution, receipt, organization, sharing, trading, and/or redemption of a DMC, as described herein.

At 1004, an interface is provided to upload a DMC. The interface can optionally reference a vendor profile or manufacturer profile associated with an uploading entity. At 1006, a mobile device is identified based at least in part on a characteristic specified in the uploaded DMC, or in a profile of a vendor/manufacturer. At 1008, a user profile associated with the mobile device is referenced and validated. Referencing the user profile can determine whether the DMC is to be received at the mobile device, for instance. At 1010, an advertisement is incorporated within an application containing the DMC, optionally where permitted by a user, vendor, or manufacturer profile.

At 1012, the DMC (and, e.g., the advertisement where suitable) is distributed to the mobile device based on the user, vendor and/or manufacturer profile. At 1014, synchronization with the mobile device, or a DMC management application loaded on such mobile device, is effected. Synchronization can be utilized to exchange dynamic and/or state data pertaining to the DMC. Dynamic data can include dynamic characteristics associated with the DMC, as described herein, or a current state of determinable circumstances defining a value/quality of such dynamic characteristics. Further, state data can pertain to active/redeemed/expired status of the DMC, or to concurrent circumstances associated with the mobile device (e.g., position, proximity to a retail location, local time). As a particular example, data pertaining to the DMC can be synchronized at both the mobile device and a network server.

At 1016, method 1000 can facilitate sharing, trading selling, and/or exchanging the DMC. For instance, a user can give the DMC to another user (e.g., as a gift). In other examples, the DMC can be a shared DMC usable by one or more of a group of individuals (e.g., a family coupon that can be utilized by one or more members of a family, or by way of mobile devices associated with such members). Exchanging the DMC among devices and/or users can further involve facilitating payment (e.g., a DMC purchase), exchange of another DMC(s) (e.g., trade), one or more games of chance (e.g., gambling where permitted by applicable law), or the like.

At 1018, method 1000 can facilitate redemption of the DMC. Redemption can be accomplished, for instance, by providing an ID of the DMC to a qualifying retail entity in conjunction with a qualifying transaction. In some aspects, redemption can be accomplished by providing a user profile in conjunction with the transaction. A retail entity can then provide the user profile information to a network device that can reference DMCs associated with the user profile, determine whether the transaction complies with one or more DMCs, and update an account of a user accordingly. At 1020, the mobile device and/or the network device can update frequent coupon points for the user based on the redemption, as described herein. Method 1000, as described, provides at least one example in which generation, distribution, sharing, and redemption of a DMC can be facilitated in conjunction with a DMC management application on a mobile device. Method 1000 can provide flexibility and convenience for richly diverse DMC users, as well as security for users, vendors, manufacturers, and like interested parties. Accordingly, method 1000 provides a substantial benefit for such parties.

Figure 11:
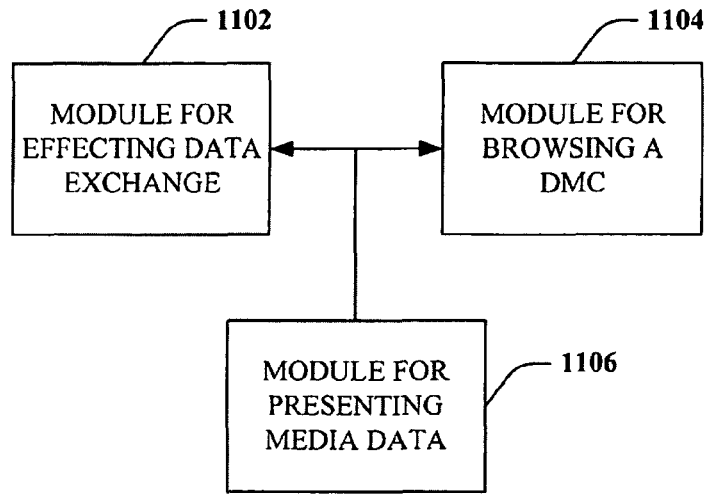
FIGS. 11 and 12 depict block diagrams of example systems for managing or facilitating management, respectively, of a DMC in a mobile environment, according to one aspect.
Figure 12:
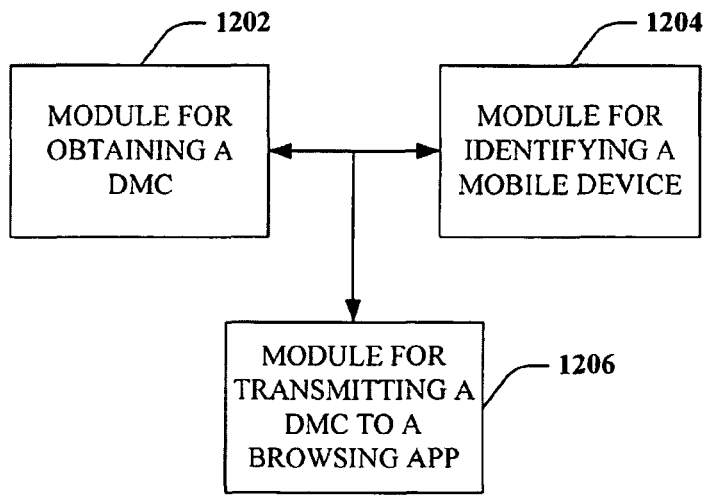

FIGS. 11 and 12 depict example block diagrams of systems (1100, 1200) that can accomplish and/or facilitate management of a DMC at a mobile device. Referring initially to FIG. 11, system 1100 can include a module for effecting wired and/or wireless data exchange 1102. The module can provide data exchange with a remote entity and obtain a mobile coupon application from such entity. The mobile coupon application can be include or be associated with a mobile coupon that includes at least one dynamic characteristic (e.g., redeemable value, applicable product/service, time of redemption, and so on). System 1100 can further include a module for browsing the mobile coupon 1104. The module 1104 can facilitate browsing the mobile coupon at a user interface of the mobile device. As a specific example, the module 1104 can facilitate browsing as a function of at least the dynamic characteristic. At 1106, system 1100 can include a module for presenting media data. For instance, the module 1106 can provide audio, video, and/or tactile feedback, pertinent to the DMC, at the user interface of the mobile device. Such feedback can be a result of selecting, opening, executing, etc. the DMC at the user interface. In some embodiments, the presented information provides a concurrent state of the dynamic characteristic. In still other embodiments, rules for determining or valuating the dynamic characteristic can also be displayed, to assist a device user in obtaining increasing a subjective and/or objective value of such DMC. Accordingly, system 1100 can provide useful functions pertinent to managing and utilizing a DMC at a mobile device.

Referring now to FIG. 12, system 1200 can include a module for obtaining a DMC 1202. The module 1202 can include an interface through which a vendor or supplier of such DMC can submit an electronic application (e.g., software, firmware, etc.) that includes the DMC. Alternatively, or in addition, the module 1202 can facilitate uploading rules for generating the DMC.

System 1200 can further include a module for identifying a mobile device 1204. Identification can be based at least in part on a predetermined characteristic (e.g., a qualifying characteristic). Such a qualifying characteristic can be included with the DMC, as provided by the vendor/supplier, or included within the rules for generating the DMC. In addition, module 1204 can determine whether the mobile device meets such characteristic based at least in part on wired and/or wireless data exchange with the mobile device.

System 1200 can additionally include a module for transmitting the DMC to a management application 1206. The management application can be an application loaded on the mobile device. Accordingly, the DMC can be transmitted by the module 1206 to such mobile device. In some aspects, the management application facilitates categorizing and browsing the DMC based at least in part on a characteristic of the DMC (e.g., a supplier, a manufacturer, a redeemable value, a product or service, or type/subject matter of the product or service, a participating retail location, terms or conditions placed on redemption, or the like as described herein or known in the art). Alternatively, or in addition, the module 1206 can submit indicia describing the DMC to the mobile device, and associate the DMC with a user profile related to the mobile device. Accordingly, the DMC can be managed at the mobile device, or at a network-based device, or both.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications, and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of managing mobile coupons at a mobile device, comprising:
    obtaining, by a transceiver of the mobile device, a mobile coupon application at least in part via wireless data exchange, wherein a mobile coupon integrated with the mobile coupon application comprises at least one variable characteristic;
    facilitating, by a processor of the mobile device in conjunction with a user interface of the mobile device, browsing, sorting, and/or searching of the mobile coupon as a function of the at least one variable characteristic;
    detecting, by the processor of the mobile device, one or more circumstances determinable by the mobile device;
    determining, by the processor of the mobile device, whether the at least one variable characteristic will change based on the detected one or more circumstances; and
    providing, by the processor of the mobile device in conjunction with a user interface of the mobile device, an audible, visual, or tactile indication of an impending change in the at least one variable characteristic at the user interface.

2. The method of claim 1, further comprising employing a redeemable value, a product or service, a coupon ID, a redemption characteristic, or a state of supplier, product or service, manufacturer, or redemption entity profile information as the at least one variable characteristic.

3. The method of claim 1, further comprising sending a wireless broadcast that requests identification of a mobile coupon available for distribution to the mobile device.

4. The method of claim 1, further comprising facilitating, by the processor of the mobile device, engaging or disengaging automatic downloading of available mobile coupons based on a user profile or user input.

5. The method of claim 1, further comprising one or more of:
  transmitting, by the transceiver of the mobile device, a first unicast message to a remote device in conjunction with obtaining the mobile coupon application;
  receiving, by the transceiver of the mobile device, a second unicast message from the remote device based on a unique characteristic of the mobile device or user profile information of the mobile device, in conjunction with obtaining the mobile coupon; or receiving, by the transceiver of the mobile device, a broadcast message from the remote device based on a general characteristic associated with the mobile device, in conjunction with obtaining the mobile coupon.

6. The method of claim 1, further comprising managing, by the processor of the mobile device, a state of the at least one variable characteristic by one or more of:
  causing the at least one variable characteristic to be displayed at the user interface; or
  extracting rules for altering the at least one variable characteristic from the mobile coupon application or the wireless data exchange and presenting the rules at the user interface.

7. The method of claim 1, further comprising ranking, by the processor of the mobile device, the mobile coupon against a second mobile coupon based on data from a user profile, a coupon interaction history, a friends list or a network data store.

8. The method of claim 1, further comprising one or more of:
  associating, by the processor of the mobile device, a user coupon point with a user coupon profile based on receipt, exchange or redemption of the mobile coupon, wherein one or more such coupon points can be exchanged for the mobile coupon; or
  associating, by the processor of the mobile device, the user coupon profile with a user loyalty card and applying a discount of the user loyalty card in conjunction with a transaction involving the mobile coupon.

9. The method of claim 1, further comprising facilitating, by the processor of the mobile device, exchanging the mobile coupon with a target mobile device or target mobile coupon device and optionally updating a variable characteristic of a second mobile coupon, or adjusting coupon points of a user profile, based on the wireless data exchange of the mobile coupon.

10. The method of claim 1, further comprising conditioning, by the processor of the mobile device, receipt of the mobile coupon application based at least in part on a distance to a providing device, a location of the mobile device, a location of a redemption entity associated with the mobile coupon, or user profile information.

11. The method of claim 1, further comprising facilitating, by the processor of the mobile device, redemption of the mobile coupon based on one or more of:
  causing the user interface to provide a visual indication of a unique ID of the mobile coupon;
  causing the user interface to provide an auditory indication of the unique ID at the mobile device;
  causing the transceiver to provide a wired or wireless electronic transmission of the unique ID to a redemption entity; or
  providing a user profile ID associated with a user of the mobile device to the redemption entity.

12. The method of claim 1, further comprising:
  wirelessly receiving, by the transceiver of the mobile device, data that identifies a product or service;
  determining, by the processor of the mobile device, whether the mobile coupon is redeemable in conjunction with a transaction involving the product or service; and
  outputting, by the processor of the mobile device, a modified transaction characteristic for the product or service based on the at least one variable characteristic of the mobile coupon.

13. The method of claim 1, further comprising wirelessly obtaining, by the transceiver of the mobile device, ID information pertaining to a product or service associated with a transaction.

14. The method of claim 13, further comprising providing, by the mobile device, mobile coupon information to a point of sale device facilitating the transaction if the mobile coupon is redeemable for the transaction.

15. The method of claim 13, further comprising coupling, by the mobile device, to a mobile network and updating a network database with mobile coupon information if the mobile coupon is redeemable for the transaction, wherein the network database is associated with a point of sale device facilitating the transaction.

16. The method of claim 15, further comprising receiving, by the transceiver of the mobile device, an updated invoice from the network database that reflects a modification to the transaction based at least on the at least one variable characteristic of the mobile coupon.

17. The method of claim 1, further comprising
  accessing information stored at a remote device linked with the mobile device, wherein the information comprises evaluation of the mobile coupon by a remote user or community of remote users.

18. The method of claim 17, wherein the community of remote users includes socially networked individuals and wherein the remote device is a social networking website.

19. The method of claim 1, wherein the impending change in the at least one variable characteristic is a change in a value of the mobile coupon from a first value to a second value, after the mobile coupon has been obtained at the mobile device.

20. The method of claim 19, wherein the change of the value is based on a physical proximity to a competing store or accessing a competing entity's website.

21. The method of claim 1, wherein the detected one or more circumstances are one or more of a location of the mobile device, proximity of the mobile device to a redemption entity, proximity of the mobile device to a mobile coupon supplier's competitor, a time of day, or an expiration date of the mobile coupon.

22. The method of claim 1, further comprising:
  presenting an audio or video indication of the mobile coupon by playing the mobile coupon application at the user interface of the mobile device.

23. An apparatus that manages mobile coupons, comprising:
  a transceiver configured for wireless data exchange that obtains a mobile coupon application, wherein a mobile coupon integrated with the mobile coupon application comprises at least one variable characteristic;
  a coupon management module configured to facilitate browsing, sorting, and/or searching of the mobile coupon at a user interface of the apparatus as a function of the at least one variable characteristic;

a dynamic evaluation module configured to detect one or more determinable circumstances and determine whether the at least one variable characteristic will change based on the detected one or more determinable circumstances;

an output module configured to provide an audible, visual, or tactile indication of an impending change in the at least one variable characteristic at the user interface;

memory configured to store data pertinent to the coupon management module, the dynamic evaluation module, and the output module; and a processor coupled to or configured to execute the coupon management module, the dynamic evaluation module, and the output module.

24. The apparatus of claim 23, wherein the coupon management module is configured to employ a redeemable value, a product or service, a coupon ID, a redemption characteristic, or a state of supplier, product or service, manufacturer, or redemption entity profile information as the at least one variable characteristic.

25. The apparatus of claim 23, wherein one or more of:
the processor is configured to send a wireless broadcast via the transceiver that requests identification of the mobile coupon available for distribution to the apparatus; or the processor is configured to receive a wireless signal via the transceiver, wherein the wireless signal indicates availability or unavailability of one or more mobile coupons.

26. The apparatus of claim 23, further comprising a participation module configured to facilitate engaging or disengaging automatic download of available mobile coupons based on user profile information or an input at the apparatus.

27. The apparatus of claim 23, wherein one or more of:
the transceiver is configured to transmit a first unicast message to a remote device in conjunction with the mobile coupon application being obtained;
the transceiver is configured to receive a second unicast message from the remote device based on a characteristic of the apparatus or a state of user profile information associated with the apparatus, in conjunction with the mobile coupon application being obtained; or
the transceiver is configured to receive a broadcast message from the remote device based on a general characteristic of the apparatus or a class of apparatus, in conjunction with the mobile coupon application being obtained.

28. The apparatus of claim 23, further comprising a dynamic valuation module configured to one or more of:
display the at least one variable characteristic at the user interface; or
extract rules for altering the at least one variable characteristic from the mobile coupon application and present the rules at the user interface.

29. The apparatus of claim 23, further comprising a social ranking module configured to categorize the mobile coupon against a second mobile coupon based on data from a user profile, a coupon interaction history, a friends list or a network data source.

30. The apparatus of claim 23 further comprising:
a point mediation module configured to associate a user coupon point with a user coupon profile based on receipt, exchange or redemption of the mobile coupon, wherein one or more such coupon points can be exchanged for the mobile coupon; and a point tracking module configured to track accumulation and expenditure of user coupon points for the user coupon profile.

31. The apparatus of claim 23, further comprising a sharing module configured to facilitate exchange of the mobile coupon with a target mobile device or target mobile coupon device and optionally configured to update a variable characteristic of a second mobile coupon, or adjust frequent coupon points of a user profile, based on the exchange of the mobile coupon.

32. The apparatus of claim 23, further comprising a coupon selectivity module configured to condition acceptance of the mobile coupon application based at least in part on a distance between the apparatus and a coupon distribution device, a location of the apparatus, a location of a coupon redemption entity or user profile information.

33. The apparatus of claim 23, further comprising a redemption module configured to one or more of:
provide a visual indication of a unique ID of the mobile coupon on the user interface;
provide an auditory indication of the unique ID at the apparatus;
provide a wired or wireless electronic transmission of the unique ID to a redemption entity; or
provide a user profile ID associated with a user of the apparatus to the redemption entity.

34. The apparatus of claim 33, wherein the redemption module is further configured to:
receive data via wireless data exchange that identifies a product or service;
determine whether the mobile coupon is redeemable in conjunction with a transaction that involves the product or service; and
display a modified transaction characteristic for the product or service based on the at least one variable characteristic of the mobile coupon.

35. The apparatus of claim 33, wherein the redemption module is further configured to obtain ID information pertaining to a product or service associated with a transaction via wireless data exchange.

36. The apparatus of claim 35, wherein the redemption module is further configured to provide mobile coupon information to a point of sale device configured to facilitate the transaction based on the mobile coupon being redeemable for the transaction.

37. The apparatus of claim 35, wherein the redemption module is further configured to couple to a mobile network and update a network database with mobile coupon information if the mobile coupon is redeemable for the transaction, and wherein the network database is associated with a point of sale device configured to facilitate the transaction.

38. The apparatus of claim 37, wherein the redemption module is further configured to receive an updated invoice from the network database that reflects a modification to the transaction based at least on the at least one variable characteristic of the mobile coupon.

39. At least one processor configured to manage a mobile coupon for a mobile device, the at least one processor coupled to or configured to execute a plurality of modules comprising:
a first module configured to obtain a mobile coupon application at least in part via wireless data exchange, wherein a mobile coupon integrated with the mobile coupon application comprises at least one variable characteristic;
a second module configured to facilitate browsing, sorting, and/or searching of the mobile coupon at a user interface of the mobile device as a function of the at least one variable characteristic;

a third module configured to detect one or more circumstances determinable by the mobile device;

a fourth module configured to determine whether the at least one variable characteristic will change based on the detected one or more circumstances; and a fifth module configured to provide an audible, visual, or tactile indication of an impending change in the at least one variable characteristic at the user interface.

40. An apparatus configured to manage a mobile coupon for a mobile device, comprising:

means for effecting wireless data exchange that obtains a mobile coupon application, wherein a mobile coupon integrated with the mobile coupon application comprises at least one variable characteristic;

means for browsing, sorting, and/or searching of the mobile coupon at a user interface of the apparatus as a function of the at least one variable characteristic;

means for detecting one or more circumstances determinable by the mobile device;

means for determining whether the at least one variable characteristic will change based on the detected one or more circumstances; and means for providing an audible, visual, or tactile indication of an impending change in the at least one variable characteristic at the user interface.

41. A non-transitory computer-readable medium, comprising:

at least one instruction to cause a computer to obtain a mobile coupon application at least in part via wireless data exchange, wherein a mobile coupon integrated with the mobile coupon application comprises at least one variable characteristic;

at least one instruction to cause the computer to facilitate browsing, sorting, and/or searching of the mobile coupon at a user interface of a mobile device as a function of the at least one variable characteristic;

at least one instruction to cause the computer to detect one or more circumstances determinable by the mobile device;

at least one instruction to cause the computer to determine whether the at least one variable characteristic will change based on the detected one or more circumstances; and at least one instruction to cause the computer to provide an audible, visual, or tactile indication of an impending change in the at least one variable characteristic at the user interface.

\* \* \* \* \*